(12) United States Patent
Zhang et al.

(10) Patent No.: US 10,901,089 B2
(45) Date of Patent: Jan. 26, 2021

(54) COHERENT LIDAR METHOD AND APPARATUS

(71) Applicants: Chunshu Zhang, Ottawa (CA); Patrick Dumais, Ottawa (CA); Dominic John Goodwill, Ottawa (CA)

(72) Inventors: Chunshu Zhang, Ottawa (CA); Patrick Dumais, Ottawa (CA); Dominic John Goodwill, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 15/936,240

(22) Filed: Mar. 26, 2018

(65) Prior Publication Data

US 2019/0293794 A1 Sep. 26, 2019

(51) Int. Cl.
*G01S 17/00* (2020.01)
*G01S 17/58* (2006.01)
(Continued)

(52) U.S. Cl.
CPC ............ *G01S 17/58* (2013.01); *G01S 7/4815* (2013.01); *G01S 7/4817* (2013.01); *G01S 7/4861* (2013.01)

(58) Field of Classification Search
USPC ............................................. 356/4.01, 5.01
See application file for complete search history.

(56) References Cited

U.S. PATENT DOCUMENTS 5,276,453 A * 1/1994 Heymsfield ............ G01S 13/582
342/112
5,767,953 A * 6/1998 McEwan ................... G01C 3/08
356/5.01
(Continued)

FOREIGN PATENT DOCUMENTS

CN 101236253 A 8/2008
CN 103946716 A 7/2014
(Continued)

OTHER PUBLICATIONS

ZhangJianhu et al "Effect of Time G Frequency Disturbance on Performance of DualG Frequency Laser Coherent Detection System"; 5 3, 0 6 1 4 0 3 ( 2 0 1 6) Laser & Optoelectronics Progress.
(Continued)

*Primary Examiner* — James R Hulka

(57) ABSTRACT

A coherent LIDAR method and apparatus are provided, in which two optical signals having a first frequency difference are reflected by an object. A difference in frequency between the corresponding received and reflected signals is determined. The frequency difference between the reflected signals differs from the first frequency difference due to Doppler effects. The object velocity is determined based on a comparison between the first frequency difference and the frequency difference in the reflected signals. The emitted signals can be produced by modulating a common light source. The reflected signals are inherently mixed at the receiver and further processed. Distance to the object can be determined by pulsing the emitted signals and measuring a time of flight by detecting corresponding pulse edges in the reflected signals, or by using phase sweeping. The emitter can be implemented using an optical phased array.

28 Claims, 17 Drawing Sheets

(51) Int. Cl.
*G01S 7/481* (2006.01)
*G01S 7/4861* (2020.01)

(56) References Cited

U.S. PATENT DOCUMENTS

| | | | | |
|---|---|---|---|---|
| 5,796,471 | A * | 8/1998 | Wilkerson | G01P 5/26 356/28.5 |
| 6,078,384 | A * | 6/2000 | Dammann | G01P 5/26 356/28.5 |
| 6,181,412 | B1 * | 1/2001 | Popescu | G01S 17/58 356/28.5 |
| 6,388,739 | B1 * | 5/2002 | Rice | G01H 9/00 356/28.5 |
| 7,777,866 | B1 | 8/2010 | Kyrazis et al. | |
| 9,310,487 | B2 * | 4/2016 | Sakimura | G01S 7/4818 |
| 9,335,415 | B2 * | 5/2016 | Jungwirth | G01S 7/493 |
| 9,778,362 | B2 * | 10/2017 | Rondeau | G01S 17/58 |
| 2006/0007423 | A1 * | 1/2006 | Guruprasad | G01S 7/4021 356/5.09 |
| 2011/0049337 | A1 * | 3/2011 | Taira | G02B 27/0944 250/216 |
| 2014/0233013 | A1 | 8/2014 | Sakimura et al. | |
| 2016/0170023 | A1 | 6/2016 | Rondeau et al. | |
| 2017/0307648 | A1 | 10/2017 | Kotake et al. | |

FOREIGN PATENT DOCUMENTS

| | | |
|---|---|---|
| CN | 204719233 U | 10/2015 |
| CN | 205374743 U | 7/2016 |
| CN | 107003411 A | 8/2017 |

OTHER PUBLICATIONS

B. Behroozpour, et al., Electronic-Photonic Integrated Circuit for 3D Microimaging, IEEE J. Solid-State Circuits, 52 (1), 161, Jan. 2017.

C. V. Poulton, et al., Coherent solid-state LIDAR with silicon photonic optical phased array, Optics Letter, 42 (20), 4091, Oct. 15, 2017.

D. Onori, et al., Coherent Laser Radar with Dual-Frequency Doppler Estimation and Interferometric Range Detection, 2016 IEEE Radar Conference.

D. Onori, et al., Coherent Interferometric Dual-Frequency Laser Radar for Precise Range/Doppler Measurement, J. Lightwave Technol., 34 (20), 4828, Oct. 15, 2016.

* cited by examiner

COHERENT LIDAR METHOD AND APPARATUS

FIELD OF THE INVENTION

The present invention pertains to the field of optical devices and in particular to a method and apparatus for coherent light detection and ranging (LIDAR).

BACKGROUND

Coherent LIDAR relies on Doppler effects to measure velocity of a target object. To measure these Doppler effects, current implementations rely on a heterodyning operation which mixes a received light signal, reflected from the object, with an internally generated light signal derived from the LIDAR transmitted light signal. However, because the received and locally generated light signals traverse optical paths of different lengths prior to mixing, these implementations are range limited. The detected ranging error due to the effect of laser phase noise is a function of this optical path difference, $2R-c\tau_0$, where R is the detected range (target distance), and $\tau_0$ is the delay of local oscillator signal. According to this equation, the ranging error will be minimized when the optical path length difference is zero. Therefore, the optical path length of local oscillator will be a limiting factor in the maximum reliable range of the LIDAR. It would be desirable to provide a coherent LIDAR that is capable of operating on objects over a larger range of distances.

Coherent solid-state LIDAR using optical phased arrays has been proposed, for example in Christopher V. Poulton, Ami Yaacobi, David B. Cole, Matthew J. Byrd, Manan Raval, Diedrik Vermeulen, and Michael R Watts, "Coherent solid-state LIDAR with silicon photonic optical phased arrays," Opt. Lett. 42, 4091-4094 (2017). Solid state devices are desirable due for example to compactness, reliability, and lack of moving parts. However, such systems are in early development and subject to improvement.

Therefore there is a need for a LIDAR apparatus and associated method that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for coherent light detection and ranging (LIDAR). In accordance with embodiments of the present disclosure, a LIDAR apparatus is provided. The apparatus includes an emitter and a receiver. The emitter is configured to emit a first optical signal and a second optical signal in a common direction for reflection by an object. An optical frequency of the first optical signal differs from an optical frequency of the second optical signal by a first frequency difference. The receiver is configured to receive a first received optical signal due to reflection of the first optical signal by the object and receive a second received optical signal due to reflection of the second optical signal by the object. The LIDAR apparatus is further configured to process the first received optical signal and the second received optical signal to measure velocity of the object toward or away from the apparatus based on Doppler effects. In some embodiments, the receiver comprises a photodetector configured to convert the mixed signal into a corresponding electronic mixed signal, and the receiver further comprises an amplifier, a filter, or both an amplifier and a filter, configured to receive and process the electronic mixed signal.

In accordance with embodiments of the present disclosure, a LIDAR method is provided. The method includes concurrently emitting a first optical signal and a second optical signal in a common direction for reflection by an object. An optical frequency of the first optical signal differs from an optical frequency of the second optical signal by a first frequency difference. The method further includes receiving a first received optical signal due to reflection of the first optical signal by the object. The method further includes receiving a second received optical signal due to reflection of the second optical signal by the object. The method further includes processing the first received optical signal and the second received optical signal to measure velocity of the object toward or away from the apparatus based on Doppler effects.

In some embodiments of the above method and apparatus, processing the first received optical signal and the second received optical signal includes receiving the first received optical signal along with the second received optical signal as components of a mixed signal, the mixed signal having a major component at a detection frequency, the detection frequency equal to a difference between a frequency of the first received optical signal and a frequency of the second received optical signal. Furthermore, in such embodiments, processing the first received optical signal and the second received optical signal includes processing the mixed signal together with an indication of the first frequency difference to measure the component of velocity of the object.

Embodiments of the disclosure measure velocity of a target object based on a comparison of Doppler shifts in two light signals, rather than relying on a local reference signal at optical frequencies. Embodiments of the disclosure can concurrently measure velocity and distance of a target object by pulsing one or more of the light signals and measuring the time interval between emitted and received pulse edges, or by a phase sweeping technique. Embodiments of the disclosure can be implemented efficiently using optical phased arrays.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
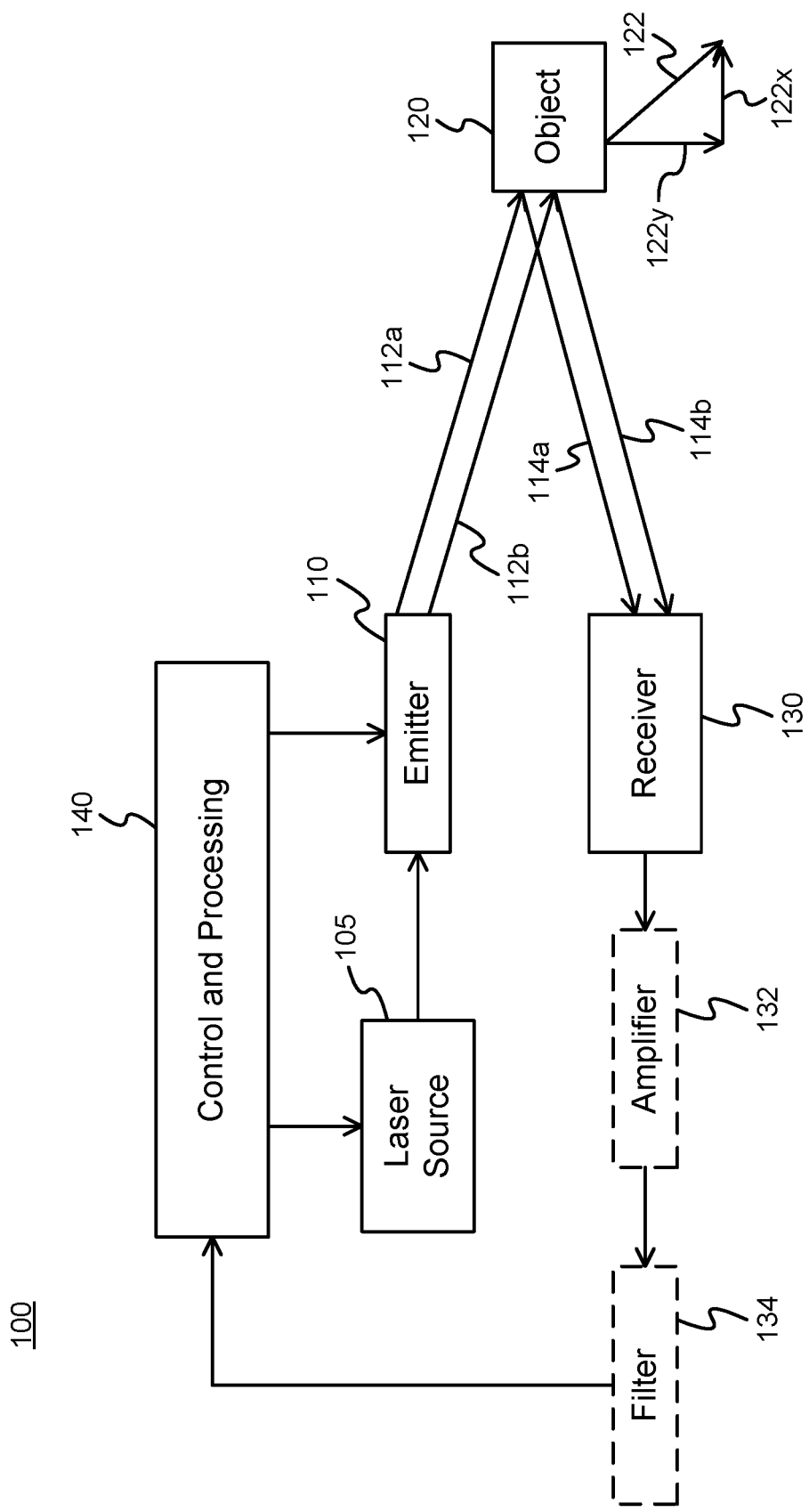
FIG. 1 is a block diagram of an overall LIDAR apparatus including an emitter and receiver, according to an embodiment of the present disclosure.

Embodiments of the present disclosure provide for a coherent LIDAR implementation which utilizes two emitted optical signals, emitted with a known frequency offset and in a common direction, to measure velocity of a target object via Doppler effects and, in various embodiments, to also simultaneously measure the distance of a target object via time of flight (TOF). Emitted optical signals are typically directed in a desired (but often variable) direction. In the far-field, the two emitted optical signals can often be viewed as two overlapping components of a single optical beam. This is due to the two emitted optical signals having closely-spaced or possibly overlapping locations of origin. This beam reflects off a target object, and some of the reflected light is detected by the LIDAR as received optical signals. The frequency difference between the two emitted optical signals after reflection is compared with the frequency difference between the two emitted optical signals before reflection (i.e. at the time of transmission), and the result of the comparison is used in a target object velocity calculation. Coherent detection as performed herein is also referred to as heterodyne detection. Coherent detection creates an electrical beat frequency present in the mixture of the two received optical signals.

Embodiments of the present disclosure comprise or utilize an emitter beam scanner (EBS) to emit the two emitted optical signals. The EBS is configured to direct optical signals in desired, typically controllable, directions. The EBS may be a mechanical scanner, optical phase modulator such as liquid crystal scanner, optical phased array (OPA) scanner or other type of scanner. Materials suitable for such a scanner include photonic integrated circuits (PIC), silicon-on-insulator (SOI) platforms, liquid crystal, and micro-electro-mechanical systems.

Embodiments of the present disclosure may be implemented partially or fully using solid-state components such as optical phased arrays (OPAs) and a PIC platform. For example, embodiments of the present disclosure can be used for LIDAR applications involving an OPA disposed on a PIC platform, having no moving parts. In some embodiments, the emitter, the receiver, or both, are integrated into a common platform comprising components formed using silicon on insulator (SOI) and complementary metal oxide semiconductor (CMOS) manufacturing operations. This can increase the reliability of the LIDAR operation, and can also mitigate cost.

An example LIDAR application is for vehicles, such as detectors for manually driven or self-driving cars. Such applications can require object distance and velocity detection over a wide range of target distances. However, the disclosure is not necessarily limited to such embodiments.

On the LIDAR transmitter side, the two optical signals are generated, with a known frequency difference $f_t$ therebetween, in one of a variety of ways. In various embodiments, narrowband input light is provided from a source such as a laser. One or more modulators receive and modulate the input light to produce one or both of a pair of pre-transmission signals, such that the frequency difference between the pair of pre-transmission signals is $f_t$. In one embodiment, the two pre-transmission signals are generated by a single modulator employing double sideband suppressed carrier (DSB-SC) modulation. In another embodiment, the two pre-transmission signals are generated by two separate modulators each employing single sideband (SSB) modulation. In yet another embodiment, one pre-transmission signal is obtained directly from the input light without modulation, while the other pre-transmission signal is generated by a modulator employing SSB modulation. The optical signals are then concurrently generated and emitted, for example using an EBS such as an OPA. In some embodiments, the two pre-transmission signals are converted to optical signals and emitted by a single common device such as a single EBS. In other embodiments, the two pre-transmission signals are each emitted using a different respective device such as one of a pair of EBSs. An indication of the frequency difference $f_r$, such as a numerical indication of $f_r$ or a signal having this frequency, may be provided for use in processing the signals received by the LIDAR receiver.

In another embodiment, the two pre-transmission signals are generated using two laser sources having a frequency difference $f_r$. In this case, the separate modulator(s) can be omitted. The relative frequencies of the two lasers may be locked. An example method and apparatus for locking the relative frequencies of lasers is described in U.S. Pat. No. 7,161,725. In another embodiment, the two pre-transmission signals are generated using a single laser source which simultaneously emits two optical frequencies separated by the frequency difference $f_r$. Again in this case, the separate modulator(s) can be omitted. Such a laser source can comprise a laser that emits two longitudinal modes of a laser cavity, as would be readily understood by a worker skilled in the art.

In some embodiments, the first and second optical signals are coherent with one another, in the sense that the relative phase shift between the two optical signals is substantially constant.

As is commonly known in LIDAR applications, emitted optical signals are reflected off of an object lying in the path of the optical signals, and the reflection is detected by an optical receiver. Scanning (i.e. directing the emitted optical signals in different directions at different times) can be used to obtain a reflection for at least some transmissions, in the case of unknown object positioning or in the case of multiple objects. In other words, scanning involves adjusting the common direction over time to measure components of velocities and positions of multiple object portions relative to the apparatus. Characteristics of the received reflections (e.g. amplitude, frequency, phase, etc.) are used to determine position and/or velocity of the object or objects. For example, a 3D point cloud indicative of object positions (optionally associated with velocity information) can be generated based on the reflections.

On the LIDAR receiver side, the two reflected signals are detected using an optical detector and then processed together to measure a component of velocity of the object relative to the apparatus based on Doppler effects. The two reflected signals are mixed together in the optical domain, to form an optical mixed signal which has a component at a frequency that is equal to a difference between a frequency of the first received optical signal and a frequency of the second received optical signal. This mixing can be performed inherently by the optical detector, due to the two reflected signals being received concurrently. The difference between received frequencies is referred to herein as the detection frequency, and denoted $f_r$. The detection frequency can differ from the frequency difference $f_r$ due to Doppler effects. Therefore, in various embodiments, a difference between the detection frequency and the frequency difference $f_r$ is determined, and an indication of velocity of the reflecting object is determined based on this determined difference. As will be readily understood, the Doppler shift is the change in frequency of an optical wave for an object that is moving relative to the light source. In this disclosure, relative movement refers to the component of motion toward or away from the LIDAR. When there is a relative movement, the frequency of each received optical signal will be shifted from its original value. Furthermore, as will be illustrated mathematically below, the different signals of the present disclosure will have different Doppler shifts due to their different frequencies.

In typical prior art coherent LIDAR implementations, a single signal, rather than two signals, is reflected off of an object. The reflected signal is mixed with a local signal that has the same frequency as the emitted signal, and the result is passed through a low-pass filter. The mixing is typically performed by a photodetector to which the reflected signal and the local signal are directed. A frequency difference between the reflected signal and the local signal is determined from the filter output. This frequency difference corresponds to a beat frequency in the mixed signal, and can be used to determine object velocity via Doppler-based calculations. However, the external path traversed by the single signal being emitted and reflected off of the object is significantly different from the internal path traversed by the local signal. In particular, the time of flight to and from the object is relatively long (for example microseconds), during which time the laser amplitude and frequency can drift or change randomly due to amplitude noise and phase-noise. Furthermore, this time of flight depends on the distance of the object. Thus, the light returned from the object may not have stable amplitude and frequency relationship with the local signal, even if they are derived from the same laser. This can lead to amplitude and frequency mismatches that can be difficult to compensate for over a wide range of object distances.

In contrast, in various embodiments of the present disclosure, the two optical signals traverse the same or substantially the same optical path, and so amplitude and frequency drift issues for the optical signals are mitigated, since they were emitted at substantially the same time. One reflected signal mixes with the other to create a beat signal, whose frequency is measured. For example, this approach can mitigate the presence of laser phase noise and its impact on detection error in a coherent LIDAR system. This can also improve the range of detecting distances that can be handled by the LIDAR system. While a local reference signal (having frequency $f_r$ equal to the frequency difference between the two optical signals) may in various embodiments still be used to determine velocity via Doppler-based calculations, the frequency $f_r$ is not dependent on the frequency of a laser, but is instead dependent on the frequency of a local electrical oscillator, whose frequency drift (in Hz) is significantly less than the frequency drift of a laser, because the frequency of the electrical oscillator is typically of the order of MHz to GHz, whereas the frequency of the laser is typically 100's of THz. This characteristic of the local reference signal mitigates the problems present in the prior art. Notably, in various embodiments of the present disclosure, measuring velocity of the object does not directly use a local copy or local portion of the first optical signal or the second optical signal, or a local copy or local portion of an optical signal used in generating the first optical signal or the second optical signal. Rather, a numerical indication of the frequency difference $f_r$, or a narrowband electronic reference signal having this frequency, is used in measuring object velocity.

FIG. 1 illustrates a LIDAR apparatus 100 according to an embodiment of the present disclosure. The apparatus 100 includes an emitter 110 configured to emit a first optical signal 112a and a second optical signal 112b in a common direction for reflection by an object 120. At transmission, an optical frequency of the first optical signal differs from an optical frequency of the second optical signal by a first frequency difference $f_r$. As will be explained further below, the emitter 110 generates the first and second optical signals 112a, 112b using light received from a laser source 105 or other suitable light source. Due to the object 120, portions of the first optical signal 112a and the second optical signal 112b are reflected back toward the LIDAR apparatus 100 for reception by a receiver 130 of the apparatus 100. These reflected and received signals are referred to respectively as the first received optical signal 114a and the second received optical signal 114b. This naming convention is used to reflect the fact that the received optical signals 114a, 114b may be frequency shifted relative to the emitted optical signals 112a, 112b due to Doppler effects.

In general, the emitter 110 is configured to emit light that has energy at two different frequencies, these frequencies being separated by a known frequency difference. The spectrum of the emitted light may thus peak at these two different frequencies. There are a variety of ways to implement such an emitter, and various non-limiting examples of such are described herein. The emitter may emit light that has energy (i.e. peaks in the emission spectrum) at more than two different frequencies. For example, for the below-described embodiments utilizing DSB-SC modulation, the carrier suppression may be omitted, thus implementing DSB modulation and causing emission to peak at a third, central frequency. However, for clarity, the present disclosure is described herein with respect to just two of these frequencies.

As will be further explained herein, in some embodiments the first and second received optical signals 114a, 114b are beat with each other at a photodetector of the receiver 130. In various embodiments, to facilitate effective beating, these received optical signals should have at least some energy of a common optical polarization, such as a linear, circular or elliptical polarization. Accordingly, the first and second emitted optical signals 112a, 112b may be configured have at least some energy of a common optical polarization. In some embodiments, therefore, the emitted light may be all of the same polarization, which may be a linear polarization.

The apparatus 100 is further configured to process the first received optical signal 114a and the second received optical signal 114b to measure a component 122x of velocity 122 of the object 120 relative to the apparatus based on Doppler effects. That is, velocity of the object in the direction toward or away from the apparatus is measured, and the velocity is relative to the apparatus when the apparatus itself is moving. As illustrated, the velocity 122 is decomposed into a component 122x which corresponds to change in distance between the apparatus 100 and the object 120, and a component 122y which is perpendicular to the component 122x. The component 122y is not measured directly in this embodiment, but in some embodiments can be determined from multiple successive measurements of object location, or by other means.

A control and processing component 140 of the apparatus 100 is configured to control components such as the laser source 105 and the emitter 110, and also support processing of the received optical signals and determination of the velocity component 122x, as well as other measurements such as object distance. The processing of received optical signals can be performed by a combination of the receiver 130 and the control and processing component 140. In some embodiments, supporting components such as an amplifier 132 and a filter 134 can be used to amplify and filter signals provided by the receiver 130 to the control and processing component 140. The filter 134 may be a relatively narrow band filter which may mitigate system noise. The control and processing component 140 can include control and processing electronics such as a microprocessor, a digital signal processor, microcontroller, associated digital and analog processing circuitry, analog to digital converters, etc. Amplifiers, filters, and other electronic components of the apparatus can similarly be implemented using digital and/or analog circuitry, as would be readily understood by a worker skilled in the art.

Figure 2A:
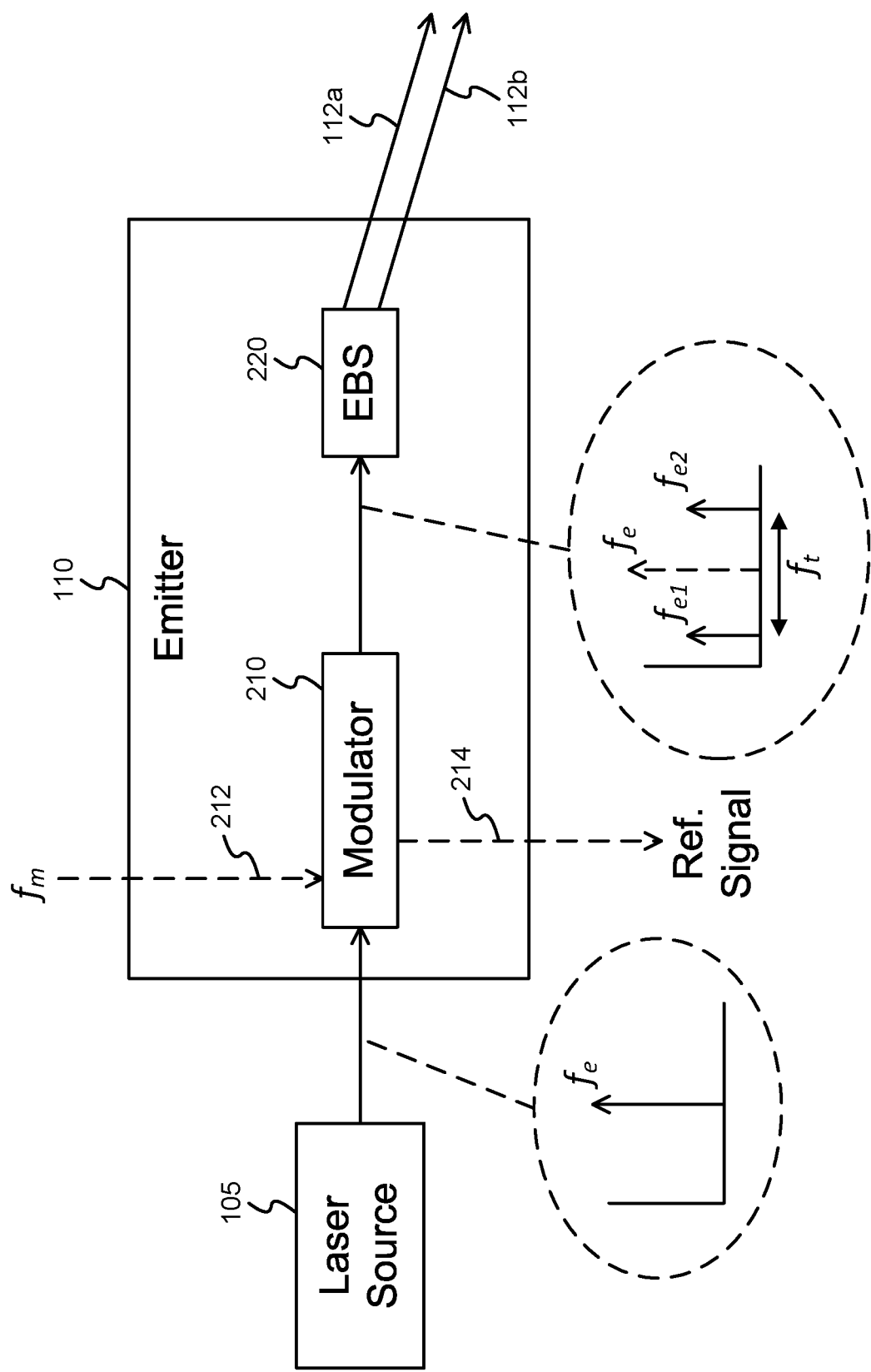
FIG. 2A is a block diagram of details of a LIDAR emitter including a single modulator for producing two frequencies of light according to an embodiment of the present disclosure.

FIG. 2A illustrates details of the emitter 110, according to an embodiment of the present disclosure. In this embodiment, the emitter 110 includes a modulator 210 configured to receive and modulate narrowband input light from the laser source 105, in order to generate a first pre-transmission signal and a second pre-transmission signal. The first pre-transmission signal has the optical frequency of the first optical signal, and the second pre-transmission signal has the optical frequency of the second optical signal. In some embodiments, the modulator 210 is a double sideband suppressed carrier (DSB-SC) modulator, modulated by an electrical signal of frequency $f_m = f_t/2$. Such a modulator can modulate the input light using a narrowband modulation signal, such as a sinusoidal modulation signal. The first and second pre-transmission signals are then the two sidebands of the DSB-SC light and $f_t$ is the difference of frequency between these two sidebands.

In more detail, and as illustrated in FIG. 2A, the frequency of the light from the laser 105 has an optical carrier frequency $f_e$, which is an optical frequency, e.g. between 187 THz and 375 THz. The modulator can use DSB-SC modulation to produce an output having two major frequency components $f_{e1}$ and $f_{e2}$, where the difference between $f_{e1}$ and $f_{e2}$ is $f_t$. This is achieved because the one copy of the carrier frequency is shifted upward and another copy is shifted downward by modulation frequency $f_m$ to produce the two frequency components $f_{e1}$ and $f_{e2}$, and the difference between $f_{e1}$ and $f_{e2}$ equals $2f_m$, i.e. $f_t$. The portion of the output corresponding to frequency component $f_{e1}$ is the first pre-transmission signal and the portion of the output corresponding to frequency component $f_{e2}$ is the second pre-transmission signal, noting that the first and second pre-transmission signals are substantially superimposed spatially at an object. In some embodiments, the modulator can receive (e.g. from the control and processing component 140) emitter modulation input 212 indicative of the modulation frequency $f_m$ to be used. In some embodiments, the modulator can provide a narrowband reference signal 214 having its frequency at a reference frequency that is equal to the difference frequency $f_t$. The reference signal 214 is in the electrical domain. The reference signal 214 may be obtained from a modulation signal, used by the modulator 210, to modulate the input light. In some embodiments, the emitter modulation input 212 can be doubled in frequency and the result can be used as the reference signal 214. The reference signal may be used for processing the received optical signals. That is, the reference signal may be used as an indication of a frequency difference between the first and second emitted optical signals.

The first and second pre-transmission signals are provided by the modulator 210 directly or indirectly to an emitter beam scanner (EBS) 220. The EBS 220 accordingly generates the first optical signal 112a based on the first pre-transmission signal and the second optical signal 112b based on the second pre-transmission signal. The first optical signal 112a therefore has its major frequency component at $f_{e1}$ and the second optical signal 112b has its major frequency component at $f_{e2}$. The EBS 220 can be controlled, by the control and processing component 140, to steer the optical signals 112a, 112b in a common, desired direction, using phased array beamforming techniques. The signals can be emitted as separate beams or as a combined beam which can be steered in different directions at different times in order to scan a spatial region.

Figure 2B:
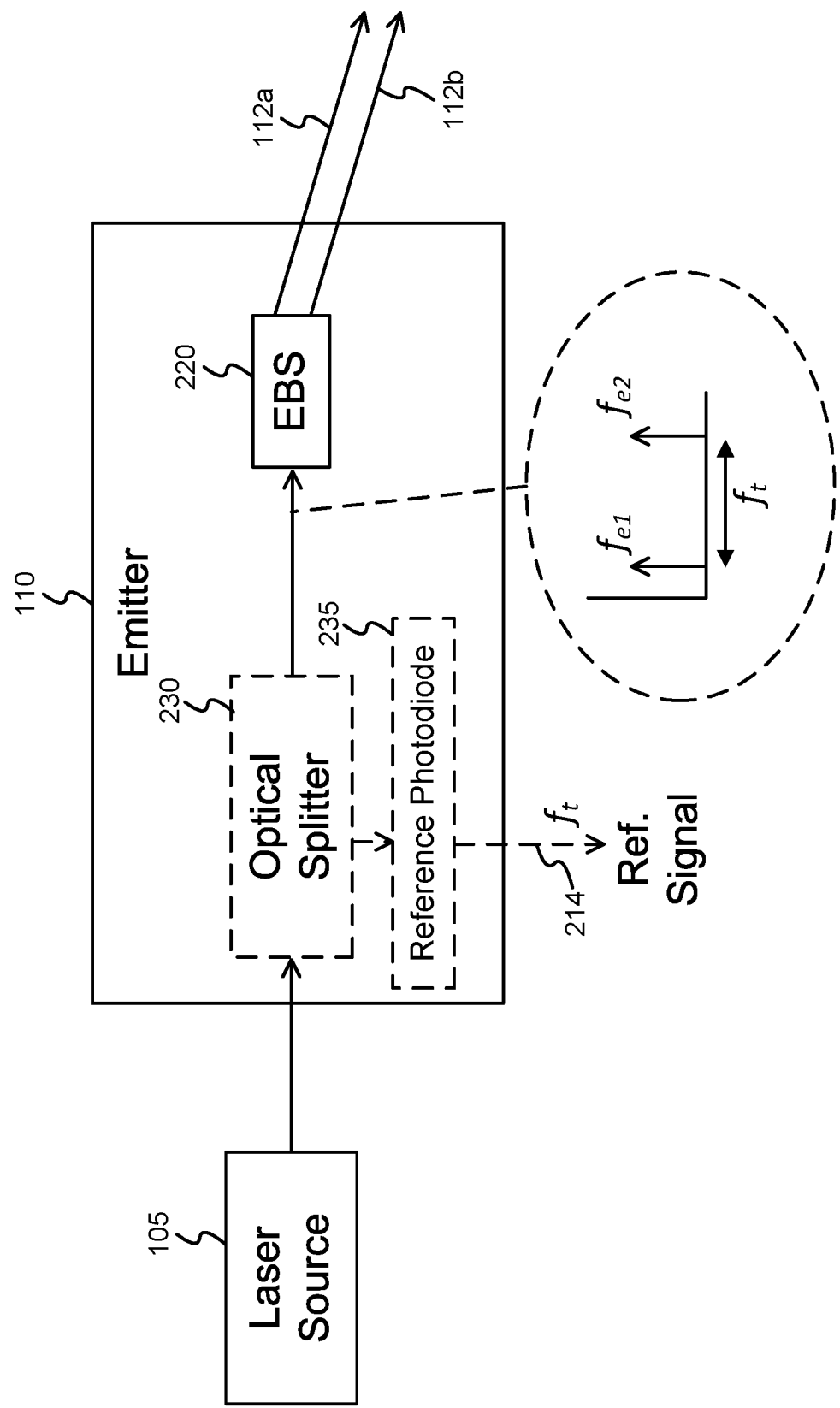
FIG. 2B is a block diagram of details of a LIDAR emitter for use with a laser source providing two frequencies of light and optionally detecting the separation of the two frequencies of light, according to an embodiment of the present disclosure.

FIG. 2B illustrates an alternative embodiment of the present disclosure, in which the two pre-transmission signals are generated using a single laser source 105 which simultaneously emits two optical frequencies separated by the frequency difference $f_r$. The pre-transmission signals are provided to the emitter 110 which comprises an EBS 220 which emits the two steered optical signals 112a, 112b. An electrical-domain reference signal 214 can also be provided which varies at the frequency $f_r$. The reference signal can be provided by using an optical splitter 230 to receive and direct a portion of the light from the single laser source 105 to a photodetector 235 such as a reference photodiode. The photodetector 235 mixes the two optical frequencies and outputs an electrical signal 214 at the difference frequency $f_r$. Photodetector 235 is thus used to measure the beat frequency between the two optical frequencies emitted by the laser.

Figure 3A:
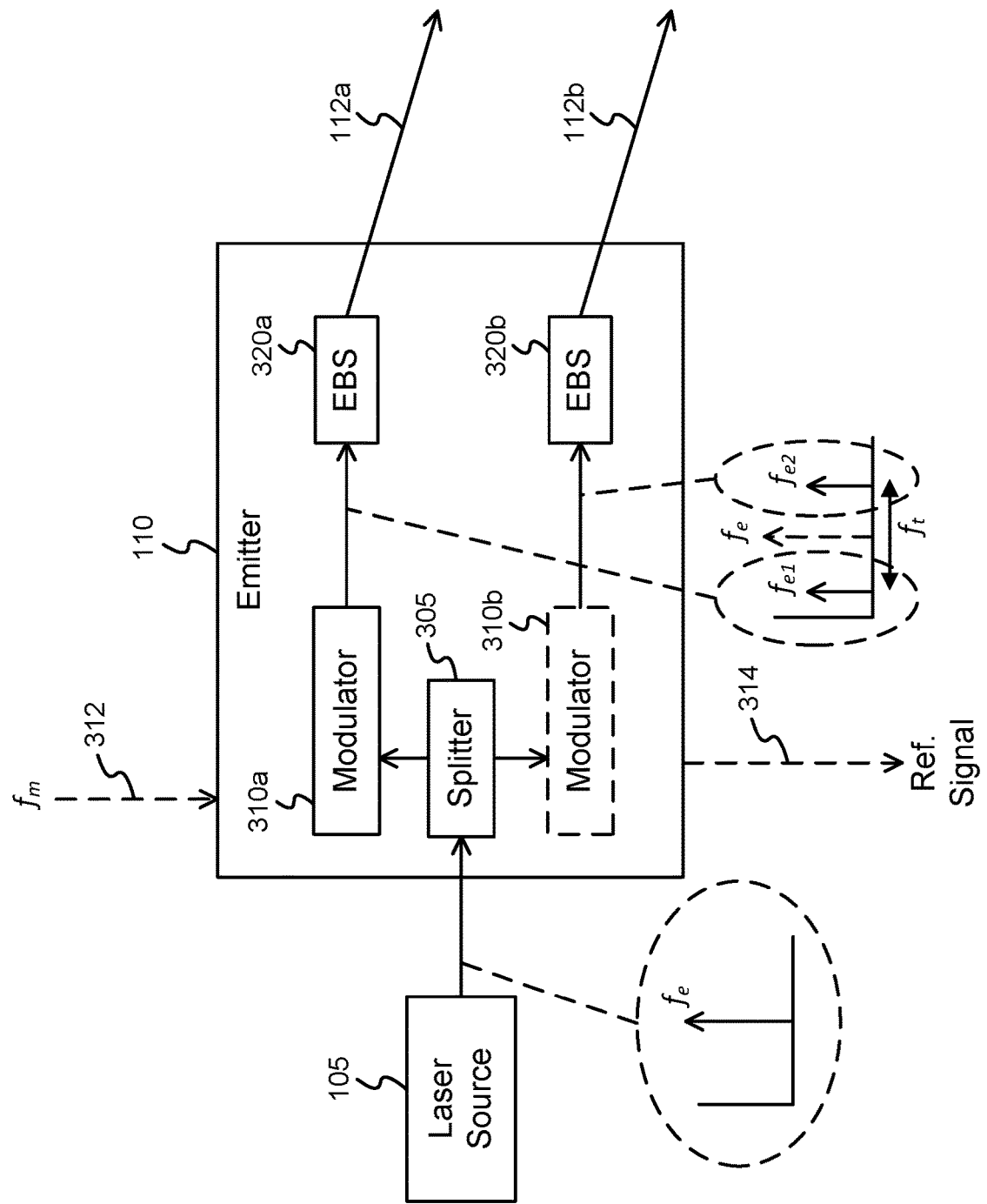
FIG. 3A is a block diagram of details of a LIDAR emitter configured to separately modulate and emit different portions of light from a common light source, according to another embodiment of the present disclosure.

FIG. 3A illustrates details of the emitter 110, according to another embodiment of the present disclosure. In this embodiment, the emitter 110 includes an optical splitter 305 configured to receive and divide the narrowband input light from the laser source 105 into two (typically substantially equal) parts, referred to herein as the first input light and the second input light. A first modulator 310a is configured to receive and modulate the first input light to generate a first pre-transmission signal. A second modulator 310b is configured to receive and modulate the second input light to generate a second pre-transmission signal. The first pre-transmission signal has the optical frequency of the first optical signal, and the second pre-transmission has the optical frequency of the second optical signal. In some embodiments, the modulators 310a, 310b are single sideband (SSB) modulators. Such modulators can modulate their respective input light using a narrowband modulation signal, such as a sinusoidal modulation signal.

In more detail, and as illustrated in FIG. 3A, the frequency of the light from the laser 105 has an optical carrier frequency $f_e$. The first and second modulators 310a, 310b can use SSB modulation to produce pre-transmission output signals having major frequency components $f_{e1}$ and $f_{e2}$, respectively, where the difference between $f_{e1}$ and $f_{e2}$ is $f_r$. The difference frequency $f_r$ can, in some embodiments, be twice a modulation frequency $f_m$ by which the optical carrier frequency is both up-shifted and down-shifted. In some embodiments, the emitter 110 can receive (e.g. from the control and processing component 140) emitter modulation input 312 indicative of the modulation frequency $f_m$ to be used, and the modulators 310a, 310b can be operated accordingly. For example, the first modulator 310a can perform lower sideband SSB modulation of the first input light in order to downshift the first input light from $f_e$ to $f_{e1}=f_e-f_m=f_e-f_r/2$. The second modulator 310b can perform upper sideband SSB modulation of the second input light in order to upshift the second input light from $f_e$ to $f_{e2}=f_e+f_m=f_e+f_r/2$.

In some embodiments, the emitter 110 can provide a narrowband reference signal 314 having its frequency at a reference frequency that is equal to the difference frequency $f_r$. The reference signal 314 is in the electrical domain. The reference signal 314 may be obtained from modulation signals used by the modulators 310a, 310b to modulate the input light. In some embodiments, the emitter modulation input 312 can be doubled in frequency (e.g. using a frequency multiplier) and the result can be used as the reference signal 314. The reference signal may be used for processing the received optical signals.

The first and second pre-transmission signals are provided by the modulators 310a and 310b directly or indirectly to corresponding first and second emitter beam scanners (EBS) 320a, 320b. The first EBS 320a accordingly generates the first optical signal 112a based on the first pre-transmission signal and the second EBS 320b generates the second optical signal 112b based on the second pre-transmission signal. The first optical signal 112a therefore has its major frequency component at $f_{e1}$ and the second optical signal 112b has its major frequency component at $f_{e2}$. The first and second EBSs 320a, 320b can be controlled, by the control and processing component 140, to concurrently steer the optical signals 112a, 112b in a common, desired direction. The signals can be steered in different directions at different times in order to scan a spatial region.

In the embodiment of FIG. 3A, the frequency shifts imparted by the two modulators do not necessarily have to be equal and opposite, provided that the frequency difference between the two pre-transmission signals is $f_r$. In an alternative embodiment, the second modulator 310b in FIG. 3A can be omitted, and the first modulator 310a can be operated to upshift or downshift the first input light from $f_e$ to $f_{e1}=f_e+f_r$. This will again cause the frequency difference between the two pre-transmission signals to equal $f_m$, but with one less modulator used. In this case, the modulation frequency $f_m$ can be set equal to the difference frequency $f_r$, and the modulation signal 312 can be provided directly as the reference signal 314.

Figure 3B:
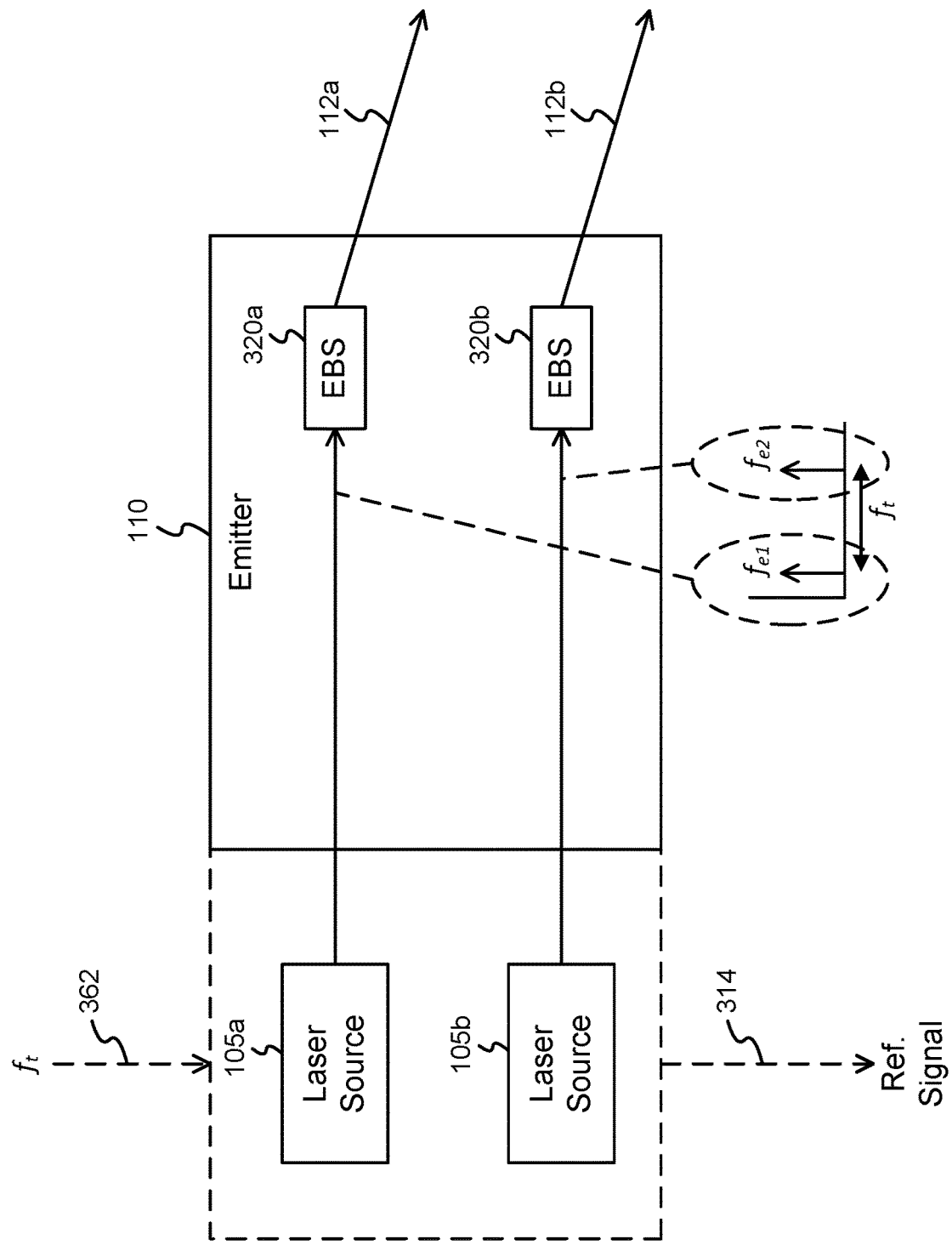
FIG. 3B is a block diagram of details of a LIDAR emitter for use with a pair of laser sources emitting light at different frequencies with controlled frequency separation, according to another embodiment of the present disclosure.

FIG. 3B illustrates an alternative embodiment of the present disclosure, in which the two pre-transmission signals are generated using two laser sources 105a, 105b having a frequency difference $f_r$. The relative frequencies of the two lasers may be locked together, that is so that the frequency difference is maintained for example through active control. The first EBS 320a receives the first pre-transmission signal output from the laser source 105a, and emits the first steered optical signal 112a. The second EBS 320b receives the second pre-transmission signal output from the laser source 105b, and emits the second steered optical signal 112b. In some embodiments, the two laser sources are locked together using a locking signal 362 having frequency $f_r$. The reference signal 314 can also be provided, for example as a copy of the locking signal 362.

Figure 3C:
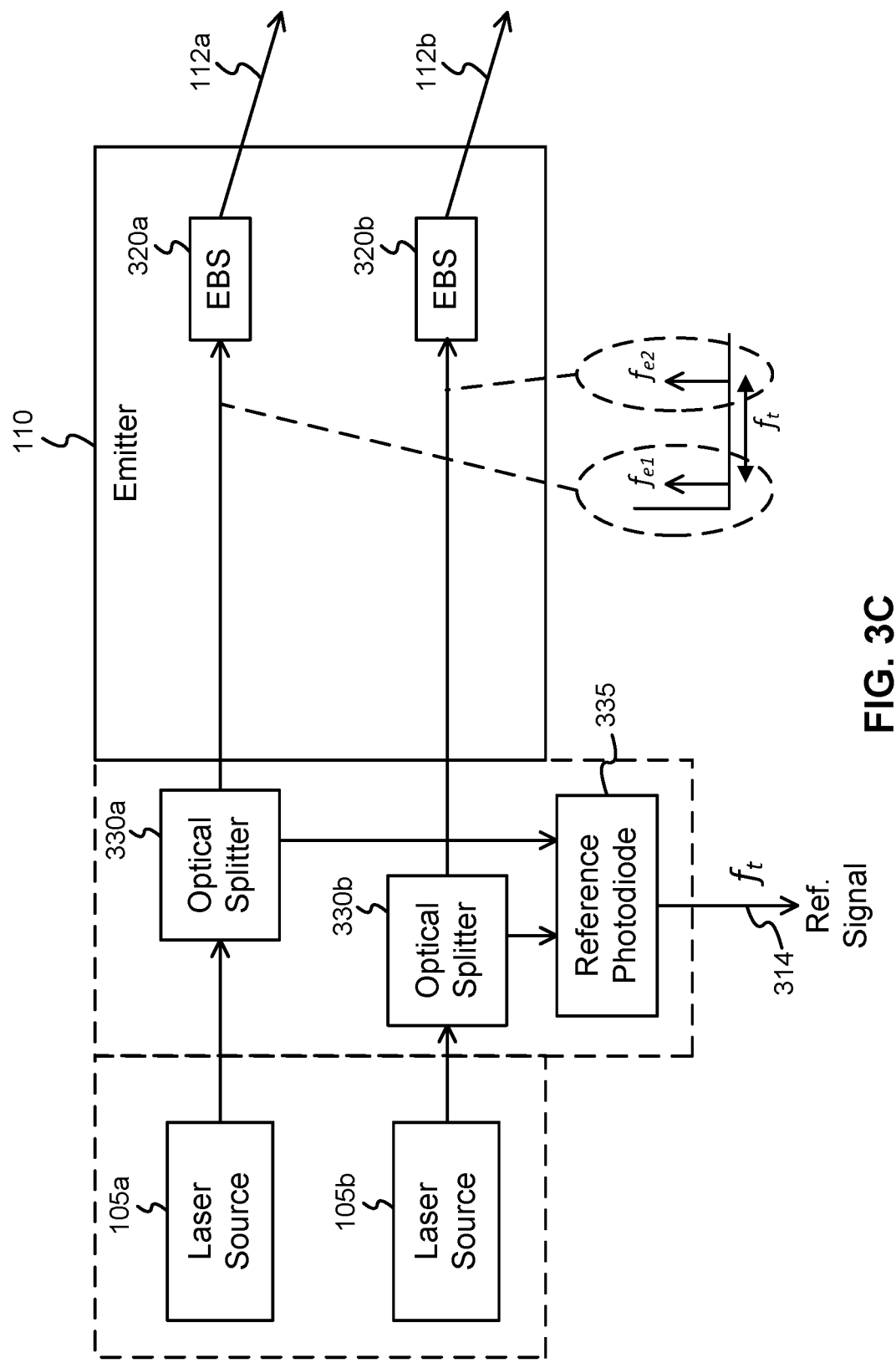
FIG. 3C is a block diagram of details of a LIDAR emitter as in FIG. 3B, and further configured to separately detect the frequency separation, according to another embodiment of the present disclosure.

FIG. 3C illustrates another alternative embodiment of the present disclosure. This embodiment is the same as FIG. 3B, except that a pair of optical splitters 330a, 330b and a photodetector 335, such as a reference photodiode, are used to generate the reference signal 314 having the frequency $f_r$. In this embodiment, the two lasers 105a, 105b may be free-running, such that they are not locked to an external reference frequency (or such that, if there is such an external reference frequency, it may not lock the lasers to sufficiently high accuracy). The optical splitter 330a receives and directs a portion of the light from the first laser source 105a to the photodetector 335, and the optical splitter 330b receives and directs a portion of the light from the second laser source 105b to the same photodetector 335. The photodetector 335 mixes the two optical frequencies and outputs an electrical signal 314 at the difference frequency $f_r$. Photodetector 335 is thus used to measure the beat frequency between the two optical frequencies emitted by the two lasers.

Figure 4:
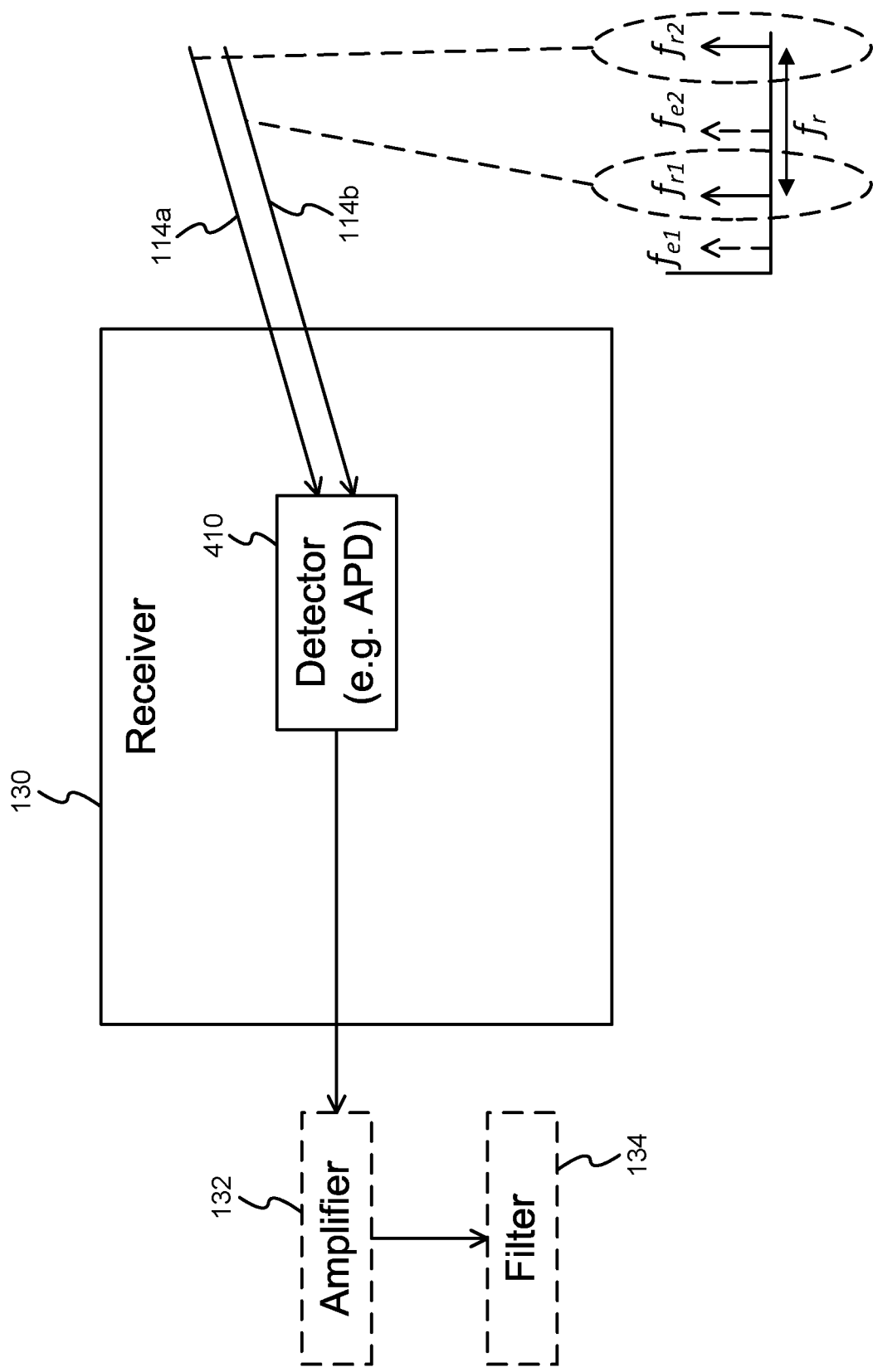
FIG. 4 is a block diagram of details of a LIDAR receiver including a detecting surface such as an avalanche photodiode for receiving multiple concurrent light reflections due to frequency-separated light emissions, according to an embodiment of the present disclosure.

FIG. 4 illustrates details of the receiver 130, according to an embodiment of the present disclosure. The receiver 130 includes a detector 410 configured to detect the first and second received optical signals 114a, 114b and generate an electronic signal indicative thereof. The detector 410 may comprise one or more photodiodes, avalanche photodiodes (APDs) or Silicon Photomultipliers (SiPMs), for example. In various embodiments, the detector 410 concurrently detects the first and second received optical signals. As such, the first received optical signal and the second received optical signal are received together as components of a mixed signal comprising the two received optical signals. A separate mixer for mixing the first and second received optical signals is therefore not required. However, in other embodiments, if the two received optical signals are detected separately (e.g. by using separate detectors with different optical filters or otherwise tuned to different frequency ranges), they may be subsequently mixed together using an optical mixer, or they may be converted to electronic signals and mixed using an electronic mixer.

Figure 5:
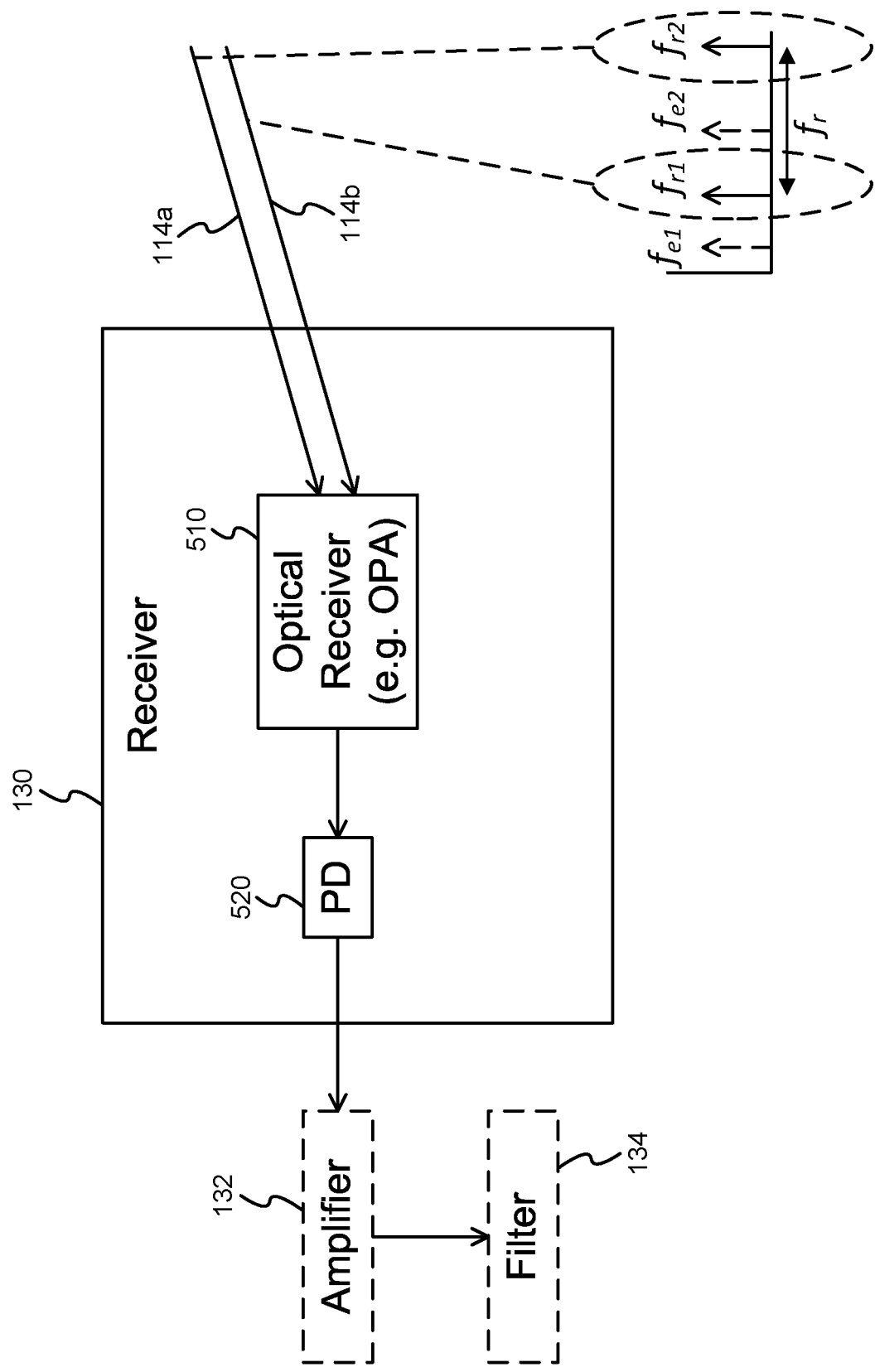
FIG. 5 is a block diagram of details of a LIDAR receiver including an optical receiver such as an optical phased array for receiving multiple concurrent light reflections due to frequency-separated light emissions and passing same to a photodiode, according to another embodiment of the present disclosure.

FIG. 5 illustrates details of the receiver 130, according to another embodiment of the present disclosure. The receiver 130 includes an optical receiver component 510 configured to receive the first and second received optical signals 114a, 114b and provide an optical signal indicative thereof. The optical receiver component 510 may comprise an optical phased array (OPA), a grating coupler, an edge coupler, a steering mirror, a lens or a combination thereof, configured to collect and internally direct the first and second received optical signals. As with FIG. 4, the optical receiver component 510 concurrently collects the first and second received optical signals. As such, the first received optical signal and the second received optical signal are collected together as components of a mixed signal comprising the two received optical signals. The receiver 130 of FIG. 5 further comprises a photodetector 520, such as a photodiode, which receives the optical mixed signal output from the optical receiver component 510 and converts same to an electronic mixed signal for further processing. Again, in an alternative embodiment, two separate optical receiver components can be used to handle the first and second received optical signals separately, with subsequent optical mixing.

The detected photocurrent from a photodetector is proportional to the total optical intensity of light received thereby. For a photodetector exposed to the two received optical signals, the photocurrent also has a frequency component, and the photocurrent oscillates with an amplitude proportional to the product of the co-polarized component of the electric field amplitudes of the two received optical signals.

As will be explained below, the entire frequency range of the mixed signal is not necessarily required for performing Doppler-based measurements. Rather, only a detection frequency of the mixed signal, being equal to a difference between a frequency of the first received optical signal and a frequency of the second received optical signal is required. Therefore, in some embodiments, it is not necessary to detect and reproduce the mixed signal with high fidelity across a wide frequency band, as long the detection frequency can be discerned with sufficient accuracy and precision. Components of the receiver 130 can accordingly be bandlimited, or have reduced fidelity away from the expected detection frequency in some embodiments. As such, some filtering of the mixed signal can be performed by components of the receiver 130. However, in some embodiments, if pulse-based distance measurements are also being taken, it will be necessary to configure the receiver 130 so that pulse edges in the mixed signal can be readily discerned, and this may require relatively wideband fidelity operation of the receiver.

The mixed signal, received by the receiver, is processed together with an indication of the first frequency difference (e.g. given as frequency $f_t$) in order to measure the component of velocity of the object. The measurement is based on a difference between the detection frequency $f_r$ and the first frequency difference. Recall that the first frequency difference is a difference between the optical frequency, at transmission, of the first optical signal and the optical frequency, at transmission, of the second optical signal. The first frequency difference can be related to the modulation frequency $f_m$ (e.g. twice the modulation frequency $f_m$), and can be indicated using a reference signal 214 or 314, or using a numerical indication, for example stored in or received from the control and processing component 140.

FIGS. 4 and 5 further illustrate the detection frequency $f_r$ as the difference between the frequency $f_{r1}$ of the first received optical signal and the frequency $f_{r2}$ of the second received optical signal. The inset to FIGS. 4 and 5 illustrates a frequency spectrum, illustrating that the frequencies $f_{r1}$ and $f_{r2}$ received by the receiver 130 may be frequency shifted from the frequencies $f_{r1}$ and $f_{r2}$ emitted by the emitter 110. The magnitude and sign of these frequency shifts, and the magnitude of the detection frequency $f_r$, depends upon the frequencies $f_{e1}$ and $f_{e2}$ and the velocity of the object, as will now be described. In particular, the component of velocity of the object toward/away from the apparatus may be determined from a relation between the transmitted difference frequency $f_t$ and the detection frequency $f_r$. According to the Doppler equation:

$$f_{r1} = f_{e1} + \Delta f_1 = f_{e1} + \frac{2 f_{e1} v}{c} \quad (1a)$$

$$f_{r2} = f_{e2} + \Delta f_2 = f_{e2} + \frac{2 f_{e2} v}{c} \quad (1b)$$

In the above and elsewhere herein, c is the speed of light, and v is the component of object velocity toward (positive) or away from (negative) the LIDAR apparatus. By examination of equations (1a), (1b), for a given non-zero object velocity, higher frequency signals experience larger Doppler shifts. Therefore, when (without loss of generality) $f_{e2}$ is greater than $f_{e1}$, the difference between $f_{r2}$ and $f_{e2}$ is greater than the difference between $f_{r1}$ and $f_{e1}$. It follows that the detection frequency $f_r$ will be different from the first frequency difference $f_{e2}-f_{e1}$ (which is equal to the reference frequency $f_t$.)

The detection frequency $f_r$ is discernible from the mixed signal, because mixing the first and second received optical signals forms a mixed signal having frequency components at least at $f_{r2}+f_{r1}$ and $f_{r2}-f_{r1}$. If required, low-pass or band-pass filtering can be performed to filter out the frequency components at $f_{r2}+f_{r1}$ in order to more readily discern the value of $f_{r2}-f_{r1}$ (the beat frequency) via frequency detection. Because the frequency $f_{r2}+f_{r1}$ is typically outside the operating range of the receiver/detector, an additional filter may not be required.

Combining (1a) and (1b) yields:

$$f_r = f_{r2} - f_{r1} = f_t + \Delta f_2 - \Delta f_1 \quad (2)$$

$$= f_t + \frac{2(f_{e2} - f_{e1})v}{c}$$

$$= f_t + \frac{2f_t v}{c}$$

The second term ($2f_t$ v/c) is defined as $\Delta f$, and referred to herein as the resultant frequency. It also follows from the above that $\Delta f = f_r - f_t$. Based on (2), if $\Delta f$ can be determined, then (assuming $f_t$ is known), the velocity component can be determined as:

$$v = \frac{\Delta f c}{2 f_t}. \quad (3)$$

It is noted that determining the velocity v using Equation (3) corresponds to multiplying $\Delta f$ by a scaling factor that is inversely proportional to $f_t$.

Embodiments of the present disclosure determine the resultant frequency $\Delta f$ either by numerical subtraction of the reference frequency (first frequency difference) and the detection frequency $f_r$, or by mixing a reference signal (having reference frequency $f_t$) with the detection signal (having detection frequency $f_r$) to form a resultant signal, low-pass filtering the resultant signal, and detecting the frequency of the low-pass filter output.

Figure 6A:
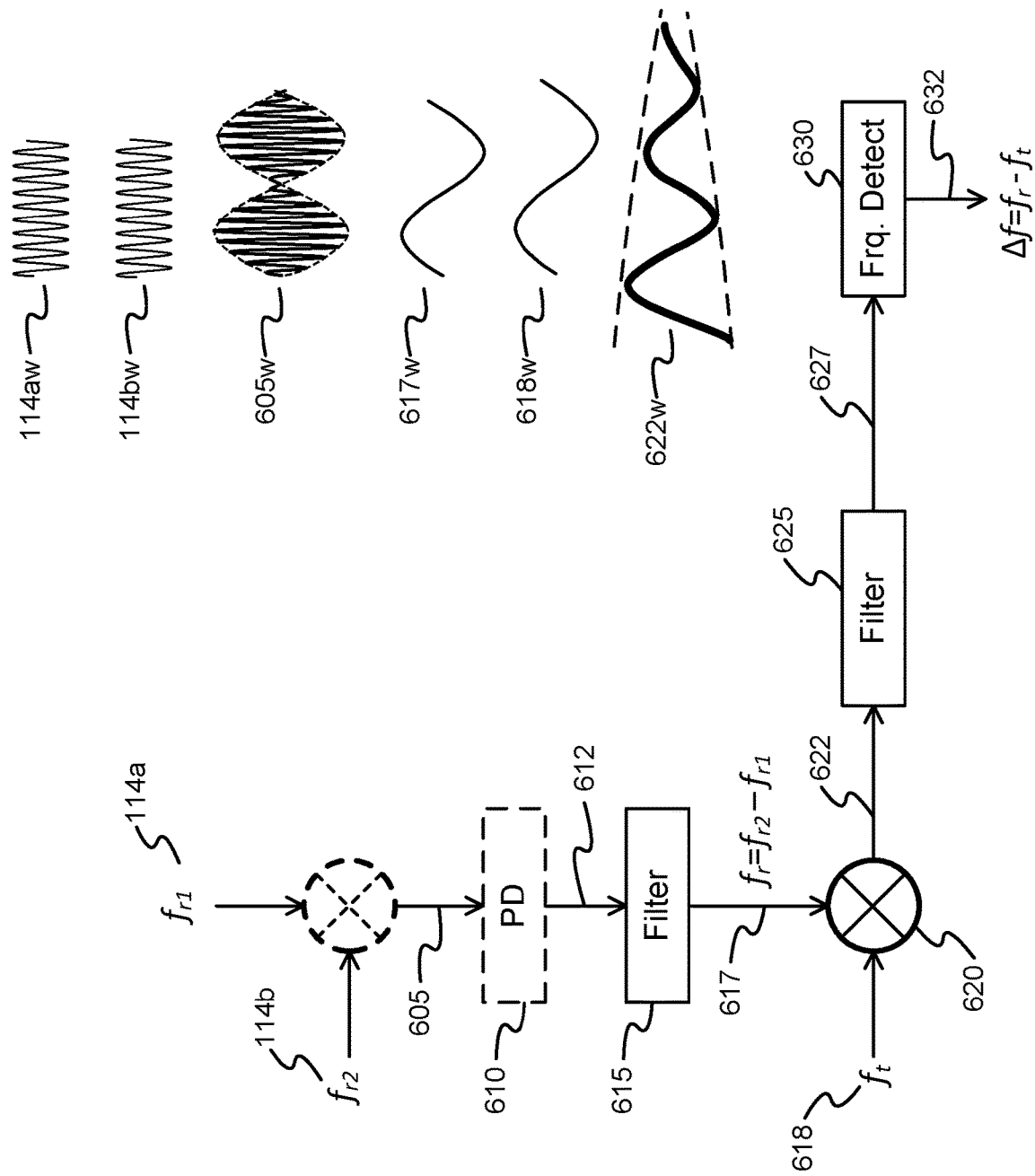
FIGS. 6A and 6B are block diagrams of a signal processing flow for processing concurrently received frequency-separated signals in order to determine a Doppler-induced change in frequency separation, according to an embodiment of the present disclosure.
Figure 6B:
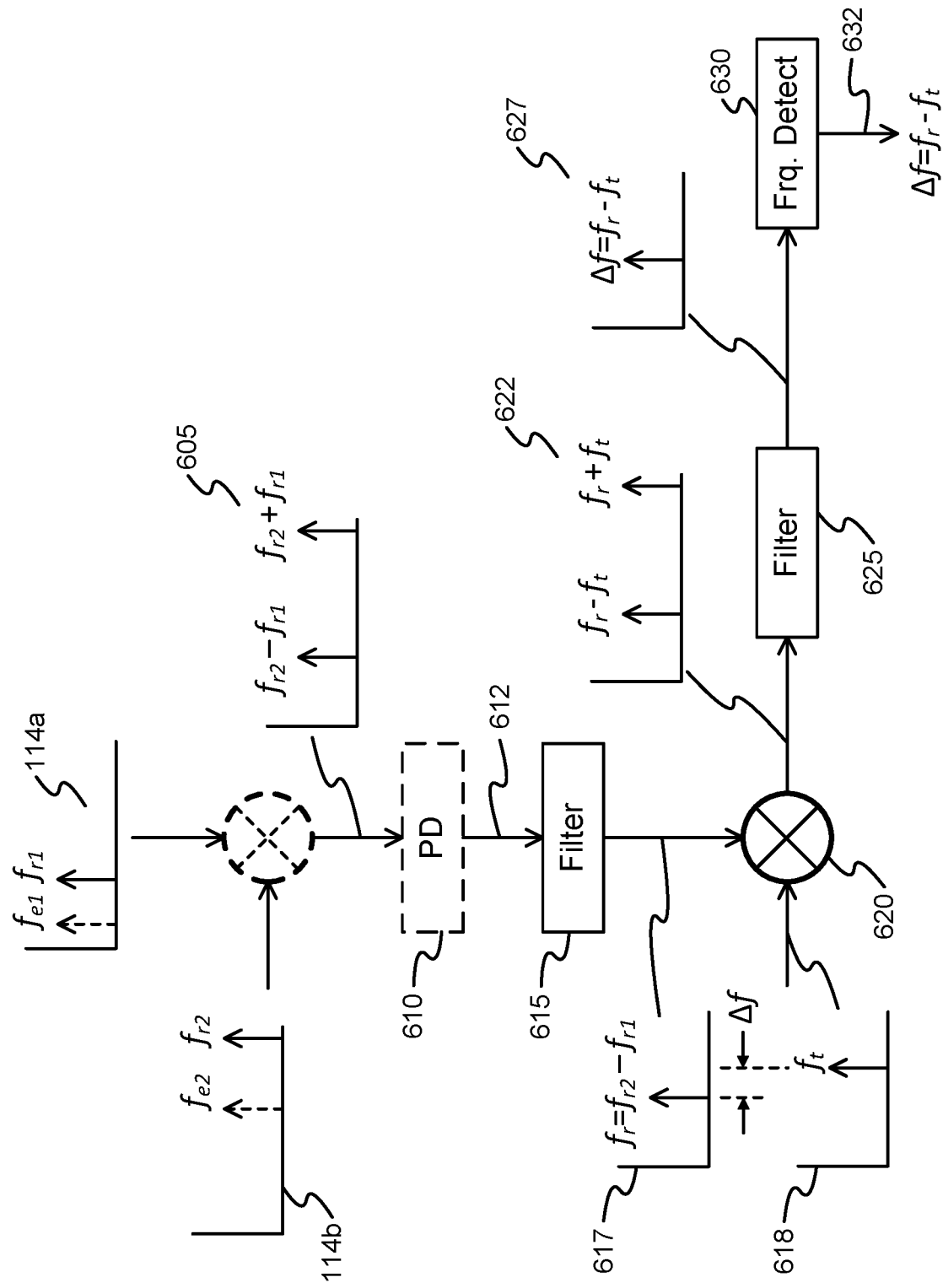

FIGS. 6A and 6B illustrate a signal processing flow according to an embodiment of the present disclosure. These two figures are identical except that FIG. 6A illustrates example waveforms in the time domain while FIG. 6B illustrates frequency domain representations of the waveforms. Initially, a mixed optical signal 605 is provided into the detector 410 or out of optical receiver component 510 of the receiver 130. The mixed signal 605 can be obtained as a mixture of the first received optical signal 114a and the second received optical signal 114b, having major components at frequencies $f_{r1}$ and $f_{r2}$, respectively. The mixed optical signal 605 is converted to an electronic mixed signal 612 via a photodetector 610. The mixed signal or electronic mixed signal is then provided to a low-pass filter 615. Alternatively, low-pass filtering can be performed concurrently with mixed signal detection. The output of the low-pass filter is a detection signal 617 having a major component at detection frequency $f_r$.

A mixer 620 receives the detection signal 617 as well as a reference signal 618 having a major frequency component at the reference frequency $f_t$. The reference signal 618 may be the same reference signal 214 or 314 of FIG. 2 or 3. The output of the mixer 620 is a resultant signal 622 comprising frequency components at least at $f_r + f_t$ and $f_r - f_t$. The resultant signal 622 is passed through a low-pass filter 625 to remove the frequency component at $f_r + f_t$ and provide a filtered resultant signal 627. The filtered resultant signal 627 is provided to a frequency detector 630 which detects the frequency thereof, which is the resultant frequency 632 $\Delta f = f_r - f_t$. The object velocity can then be determined (computed) via Equation (3).

FIG. 6A also illustrates example waveforms 114aw, 114bw, 605w, 617w, 618w and 622w corresponding, respectively, to the first received optical signal 114a, the second received optical signal 114b, the mixed optical signal 605, the detection signal 617, the reference signal 618, and the resultant signal 622. Each example waveform is either a sinusoidal signal (114aw, 114bw, 617w, 618w) or a mixture of two sinusoidal signals (605w, 622w). Only a limited portion of signal 622w is shown, however signal 622w resembles signal 605w but is at a lower frequency. Other types of signals, such as narrowband signals, or signals showing non-ideal behaviours, can also be employed.

The filters illustrated in FIGS. 6A and 6B perform low pass or band pass filtering in order to keep desired signal components, while blocking undesired signal components. The placement of the filters can be varied in several ways. For example, in some embodiments, part or all of the filtering can be performed by other components such as detectors, photodetectors, frequency detectors, or mixers, or electronically by the control and processing component. In some embodiments, filters can be moved downstream in the signal processing chain. For example, all filtering can be performed immediately prior to frequency detection, provided that reliability of the apparatus is maintained. Each of the filters 615, 625, 632 and the mixer 620 may be analog electrical elements or may be implemented in a digital signal processor.

Figure 7:
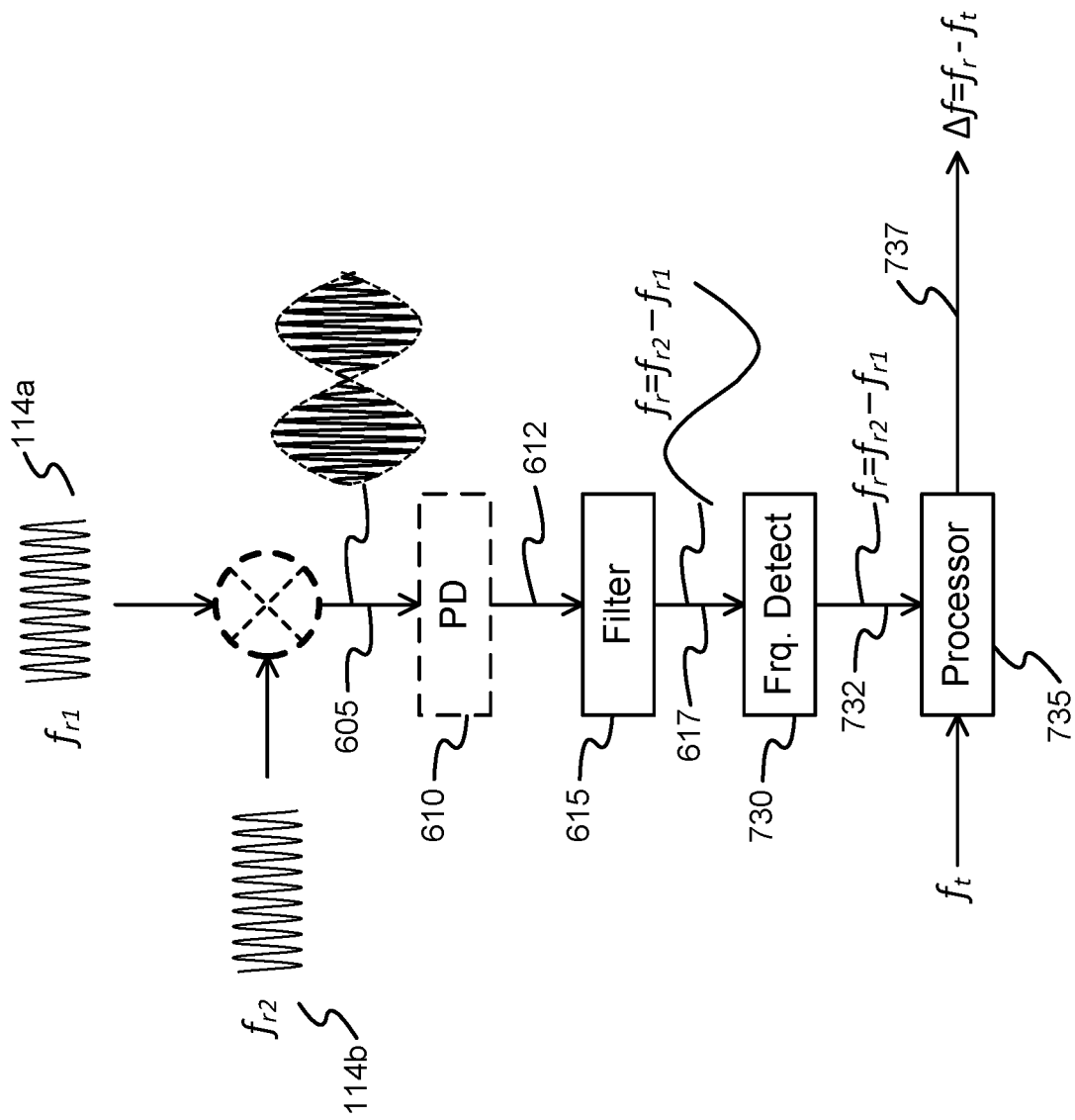
FIG. 7 is a block diagram of an alternative signal processing flow for processing concurrently received frequency-separated signals in order to determine a Doppler-induced change in frequency separation, according to another embodiment of the present disclosure.

FIG. 7 illustrates an alternative signal processing flow, according to another embodiment of the present disclosure. In this embodiment, a detection signal 617 is derived in a similar manner to FIG. 6. The detection signal 617 is passed to a frequency detector 730 which provides a numerical value 732 (i.e. an electrical signal indicating such a numerical value) indicative of the detection frequency $f_r$. The detection frequency can be measured by the frequency detector 730 as a beat frequency present in the mixed signal. A processor 735 obtains the numerical value 732 and determines a difference between the detection frequency $f_r$ and the reference frequency $f_t$, which is also obtained by the processor. The processor 735 outputs this difference as the resultant frequency 737 $\Delta f = f_r - f_t$. The object velocity can then be determined (computed) via Equation (3).

Embodiments of the present disclosure can further be configured to determine distance to the target object concurrently with determining a component of velocity of the target object. For determining distance, the emitter may be further configured to emit one or both of the optical signals as pulsed signals. The pulsed signals have a first pulse edge emitted at a first time. For example, the emitter can alternate between transmission of the optical signals and refraining from emitting the optical signals, with the beginning or ends of the transmissions being performed at known times. The receiver is configured to detect corresponding pulse edge(s) in the received optical signal(s) and register a second time at which the corresponding pulse edge(s) is (or are) detected. The apparatus is further configured to measure a distance to the object based on a comparison of the first time and the second time. The distance can be determined based on time of flight. That is, if the time of an emitted pulse edge is $t_1$, and the time of a corresponding received pulse edge is $t_2$, then the distance D to the object is determined as $D = c(t_2 - t_1)/2$, where c is the speed of light in the relevant medium (e.g. air). It is noted that the same optical signals can thus be used for both distance and velocity determination. The period and duty cycle of the pulsed signals can be tuned to facilitate distance measurement while also supporting velocity measurement. In some embodiments, only one of the first and second signals is pulsed at a time. This can allow the receiver to more consistently monitor the emitted signals. Velocity is determined at times when both signals are concurrently received. Alternatively, a phase sweeping approach may be used for determining distance, as described later herein.

Figure 8:
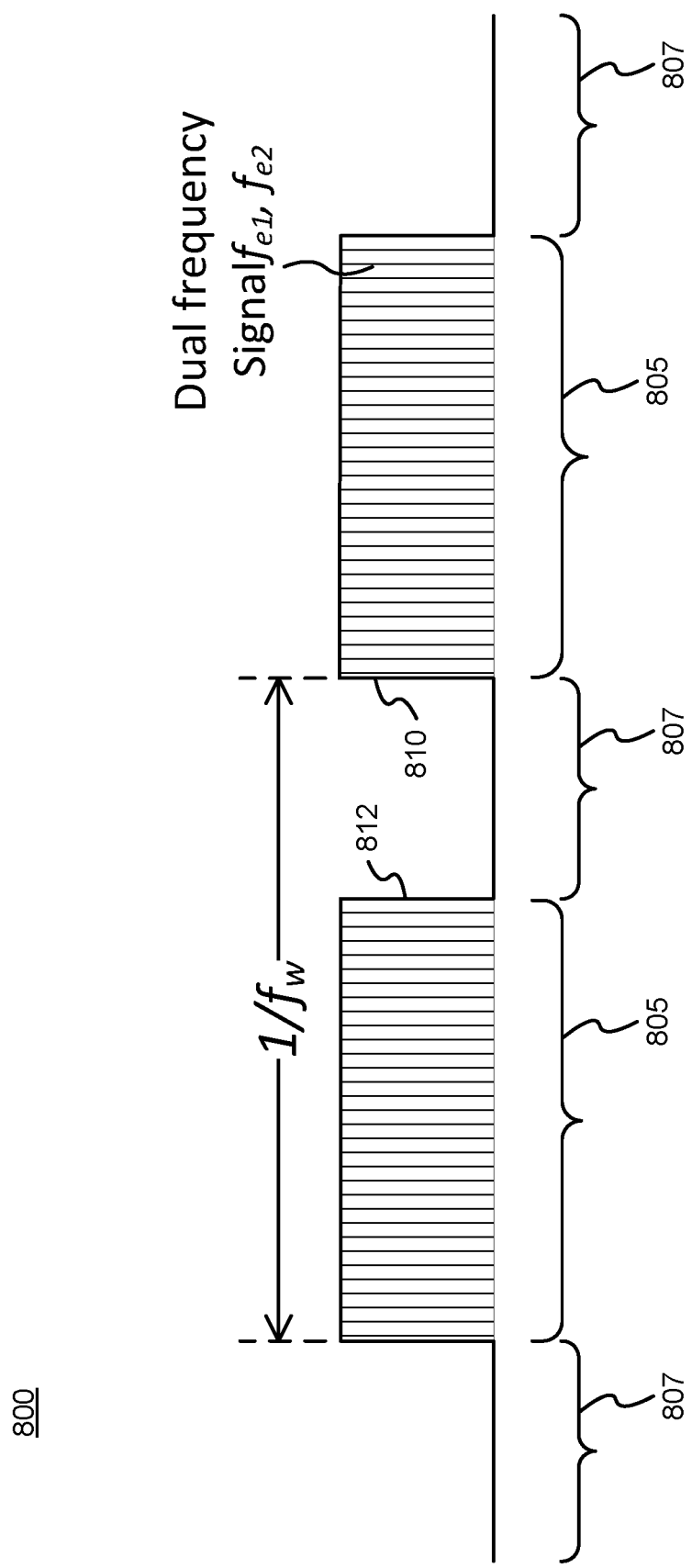
FIG. 8 is a graphical time-domain representation of a pulsed waveform for emission from a LIDAR transmitter in order to support object distance measurement by measuring time between transmission and reception of pulse edges, according to an example embodiment of the present disclosure.

Referring again to FIG. 1, the control and processing component 140 can be configured to cause the emitter 110 to begin and end optical signal transmissions at set times, thereby producing a pulsed signal. The time $t_1$ that a pulse edge, due to beginning or ending of an optical signal transmission, occurs can be recorded by the control and processing component. The control and processing component 140 further receives a corresponding received optical signal and detects a corresponding pulse edge therein. The time $t_2$ of reception of the pulse edge is also recorded and used to determine the distance D to the object. FIG. 8 illustrates a pulsed waveform 800 according to an example embodiment of the present disclosure. The pulsed waveform includes first portions 805 during which the first and second optical signals are emitted (or the first and second received optical signals are detected). The pulsed waveform includes second portions 807, alternating with the first portions 805, during which the first and second optical signals are not emitted (or the first and second received optical signals are not detected). If only one of the optical signals is being pulsed, then the pulsed waveform includes only that optical signal.

The pulse edge can be a rising pulse edge 810 or a falling pulse edge 812. Pulse edges occur at the boundaries between the first and second portions 805 and 807. The pulsed waveform is pulsed on and off periodically at a frequency $f_w$, so that the period of the pulsed waveform is $1/f_w$. Alternatively pulsing can be done at irregular intervals. The period of the pulsed waveform is selected so that the pulse edges can be reliably detected. The duty cycle of the pulsed waveform is also variable.

Figure 9:
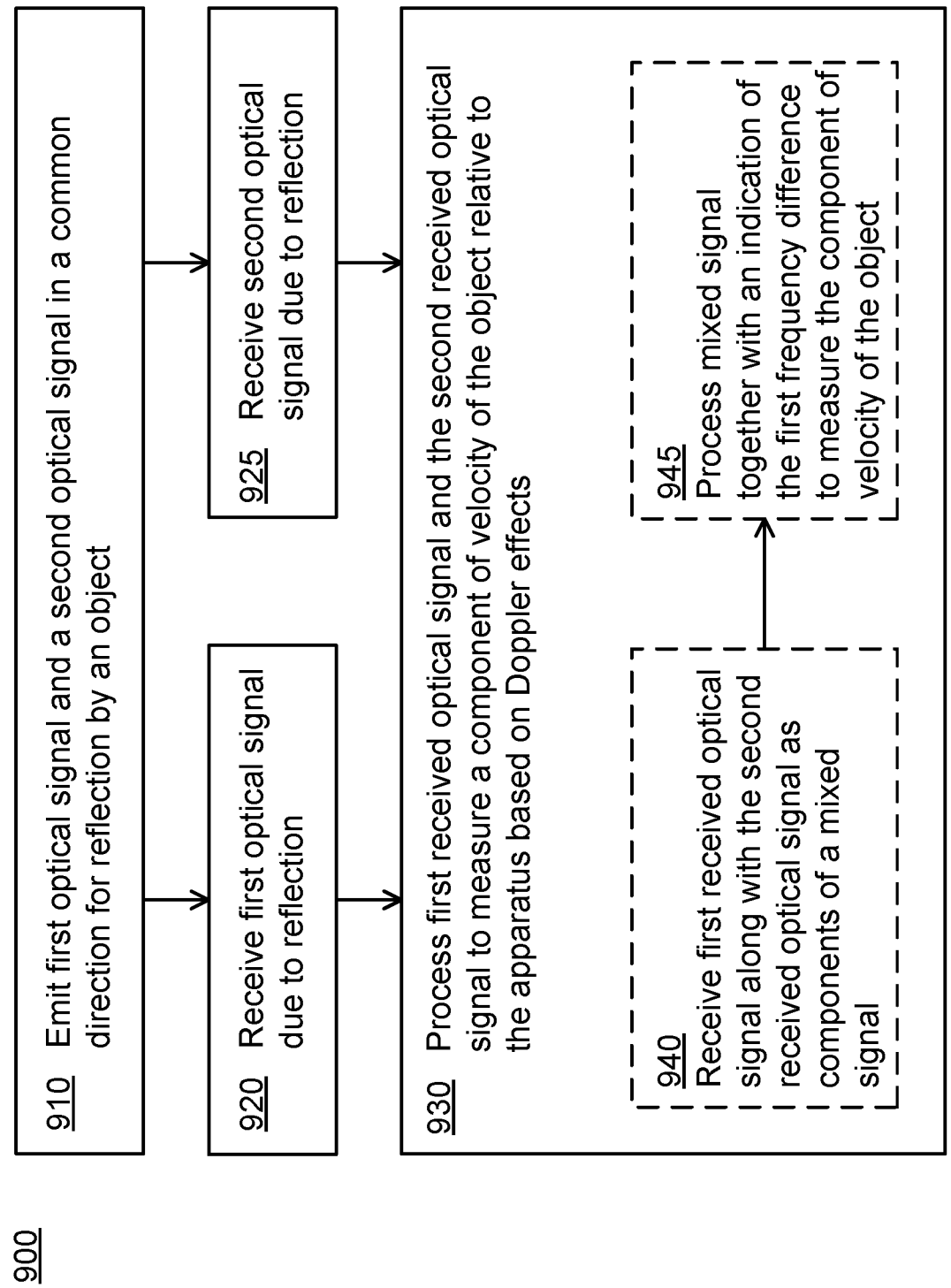
FIG. 9 is a flow chart of a LIDAR operation method in which two frequency-separated light signals are emitted and their reflections are received and processed to determine object velocity, according to an embodiment of the present disclosure.

FIG. 9 illustrates a LIDAR method 900 according to an embodiment of the present disclosure. The method includes concurrently emitting 910 a first optical signal and a second optical signal in a common direction for reflection by an object. An optical frequency of the first optical signal differs from an optical frequency of the second optical signal by a first frequency difference. The method further includes receiving 920 a first received optical signal due to reflection of the first optical signal by the object, and concurrently receiving 925 a second received optical signal due to reflection of the second optical signal by the object. The method further includes processing 930, for example using a computer processor, possibly along with mixers, filters, or a combination thereof, the first received optical signal and the second received optical signal to measure a component of velocity of the object relative to the apparatus based on Doppler effects. That is, velocity of the object in the direction toward or away from the apparatus is measured, and the velocity is relative to the apparatus when the apparatus itself is moving.

In some embodiments, the processing 930 includes receiving 940 the first received optical signal along with the second received optical signal as components of a mixed signal. The mixed signal has a major component at a detection frequency which is equal to a difference between a frequency of the first received optical signal and a frequency of the second received optical signal. In these embodiments, the processing further includes processing 945 the mixed signal together with an indication of the first frequency difference to measure the component of velocity of the object.

Figure 10:
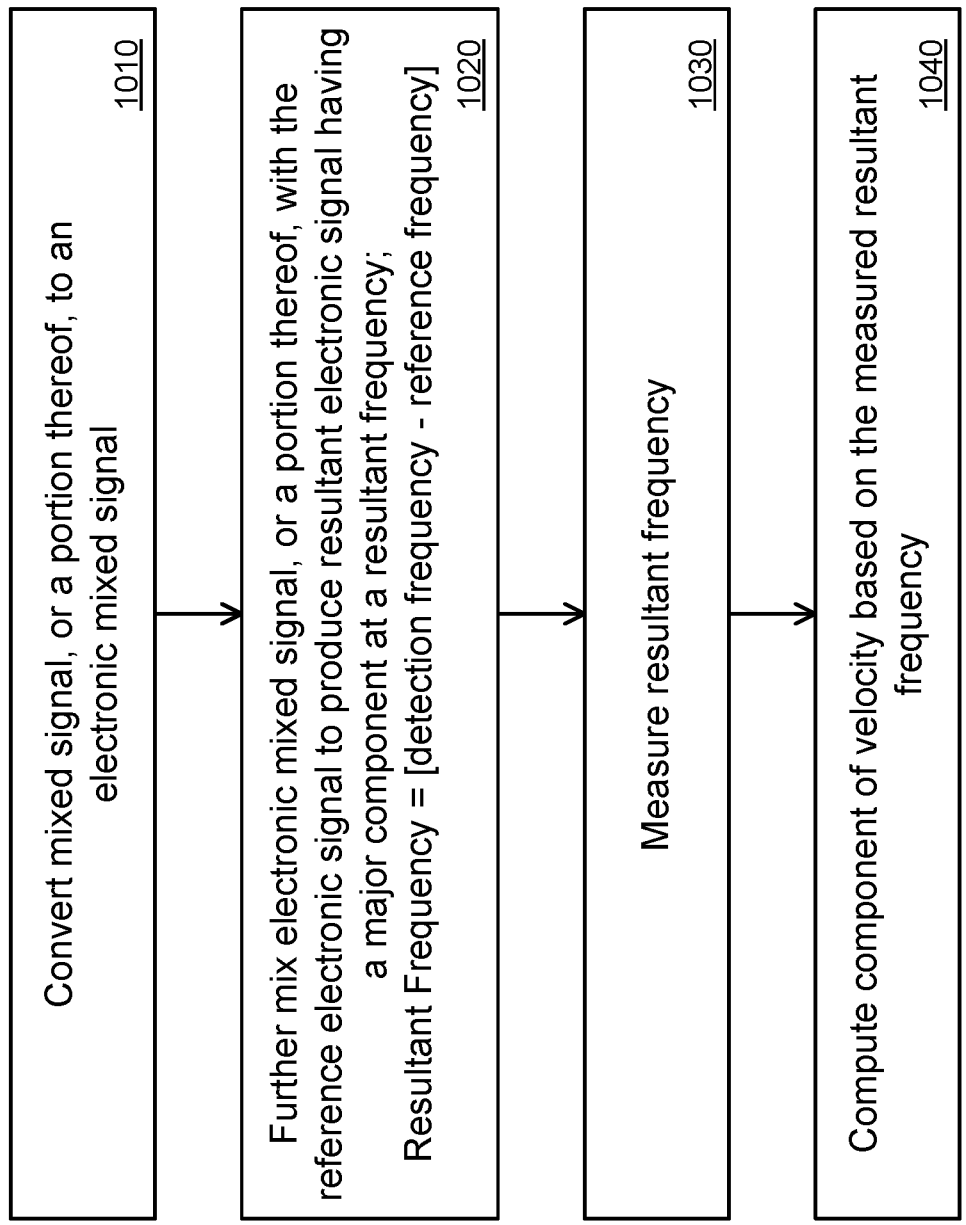
FIG. 10 is a flow chart of further operations of the method of FIG. 9, including signal mixing operations for determining a change in signal frequency separation from transmission to reception, according to some further embodiments of the present disclosure.

FIG. 10 illustrates operations of the method 900 according to some further embodiments of the present disclosure. In such embodiments, the indication of the first frequency difference is a reference signal having a major component at a reference frequency equal to the first frequency difference. In this case the method 900 further includes converting 1010 the mixed signal, or a portion thereof, to an electronic mixed signal. The method further includes further mixing 1020 the electronic mixed signal, or a portion thereof, with the reference signal. The further mixing produces a resultant electronic signal having a major component at a resultant frequency, which is equal to a difference between the detection frequency and the reference frequency. The method 900 further includes measuring 1030 the resultant frequency of the resultant electronic signal. The method 900 further includes computing 1040 the component of velocity based on the measured resultant frequency. In some embodiments, the reference signal is obtained from a modulation signal, where one or more modulators are configured to generate the first optical signal and the second optical signal by modulating input light using the modulation signal. Operation of the method of FIG. 10 may correspond to the operations illustrated in FIGS. 6A and 6B.

Figure 11:
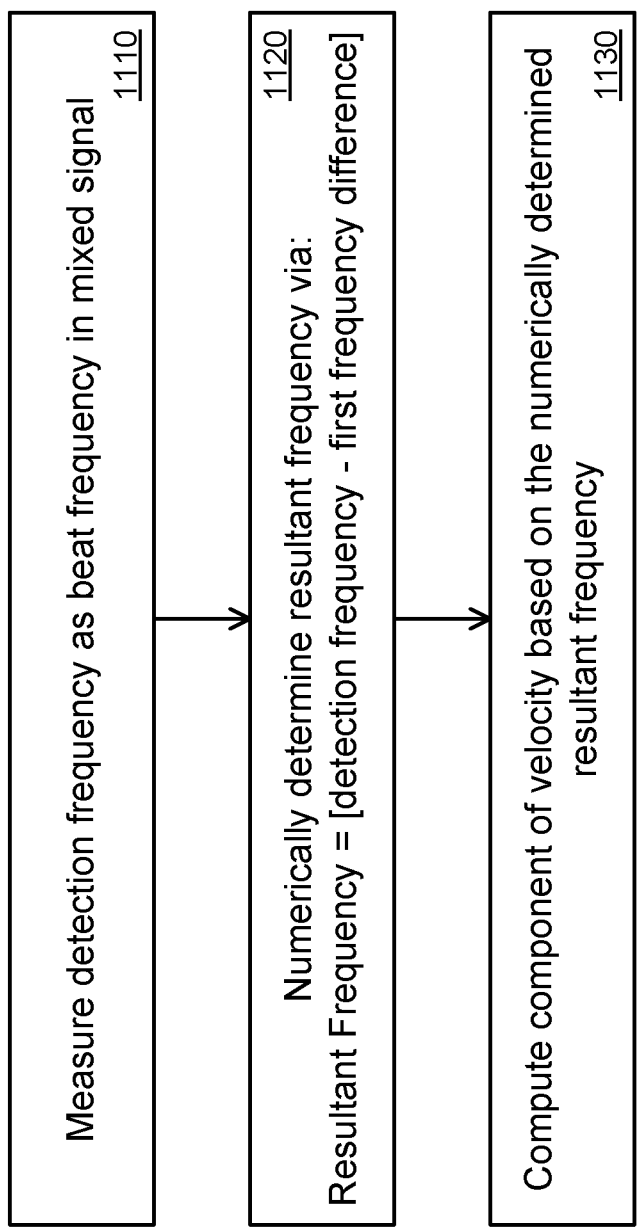
FIG. 11 is a flow chart of further operations of the method of FIG. 9, including numerical operations for determining a change in signal frequency separation from transmission to reception, according to other further embodiments of the present disclosure.

FIG. 11 illustrates operations of the method 900 according to other further embodiments of the present disclosure. In such embodiments, the indication of the first frequency difference is a numerical indication of the first frequency difference. In this case the method 900 further includes measuring 1110 the detection frequency by measuring a beat frequency present in the mixed signal. The method 900 further includes numerically determining 1120 a resultant frequency equal to a difference between the measured detection frequency and the numerical indication of the first frequency difference. The method 900 further includes computing 1130 the component of velocity based on the numerically determined resultant frequency. Operation of the method of FIG. 11 may correspond to the operations illustrated in FIG. 7.

Figure 12:
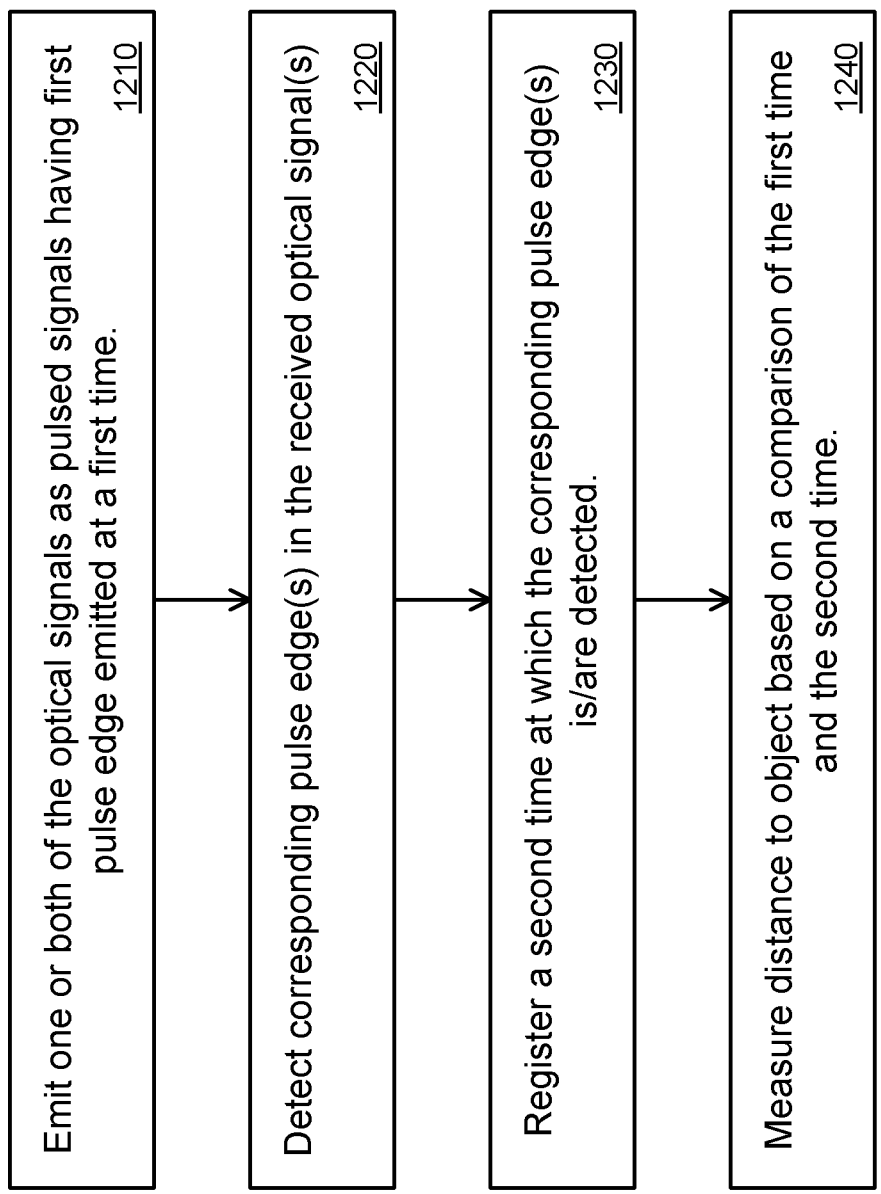
FIG. 12 is a flow chart of further operations of the method of FIG. 9 according to other further embodiments of the present disclosure, including signal pulse edge detection, for simultaneous target object velocity and distance measurement.

FIG. 12 illustrates operations of the method 900 according to other further embodiments of the present disclosure. In such embodiments, the method further comprises emitting 1210 one or both of the optical signals as pulsed signals. The pulsed signals have a first pulse edge emitted at a first time. The method further comprises detecting 1220 corresponding pulse edge(s) in the received optical signal(s) and registering 1230 a second time at which the corresponding pulse edge(s) is (or are) detected. The method further comprises measuring 1240 a distance to the object based on a comparison of the first time and the second time. The distance can be determined based on time of flight, as described elsewhere herein.

Numerical examples of embodiments of the present disclosure are as follows. In an example embodiment, to measure the longitudinal velocity component (i.e. the component of velocity of the object in the direction toward or away from the LIDAR), of an object moving at 100 km/h to an accuracy of 10%, the modulator frequency is configured to be stable to about 100 Hz over the time-of-flight of the light, which is about 1 microsecond.

For a first frequency difference $f_t$ of 10 GHz and a target object having longitudinal velocity component of 100 km/h (27.8 m/s), the resultant frequency $\Delta f$ is about 1.855 kHz. If the target object instead has a longitudinal velocity component of 90 km/h (25 m/s), the resultant frequency $\Delta f$ is about 1.668 kHz. Speed of light c for this example is assumed to be 299,792,458 m/s.

Figure 13:
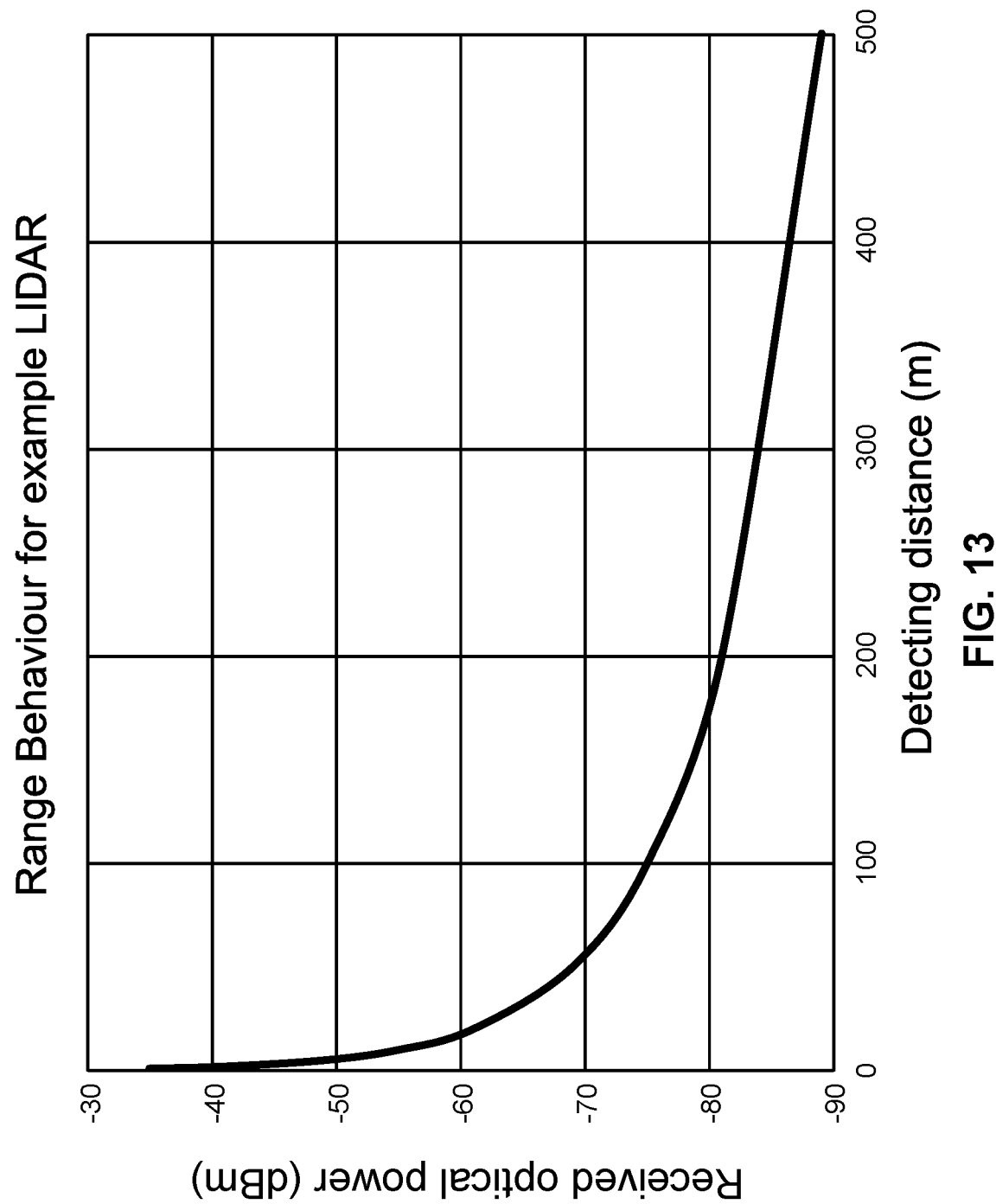
FIG. 13 is a graph of received optical power as a function of detection distance for a practical LIDAR example.

FIG. 13 graphically illustrates received optical power as a function of detection distance for a practical LIDAR example, which is applicable for embodiments of the present disclosure. Relevant details can be found in D. Onori, et al., Coherent Interferometric Dual-Frequency Laser Radar for Precise Range/Doppler Measurement, J. Lightwave Technol., 34 (20), 4828, Oct. 15, 2016. The received optical power decays to about −90 dBm at an object distance of about 500 m. This example relates to a scenario in which emitter optical power is 10 mW, the scanning beam is about 1550 nm wavelength, the receiver lens diameter is about 5 cm, the receiver aperture is about 0.002 m$^2$, target reflectivity p is about 0.1 (reflectivity of dark paper), and the received power P$_r$ as a function of target distance R is given by P$_r$=P$_e$ρd$^2$/8R$^2$. The distance accuracy of coherent LIDAR at longer distances will drop as the signal-to-noise ratio at the detector decreases.

While the present disclosure has primarily been described in terms of fixed optical frequencies, it should be understood that these optical frequencies may vary in time. As is known in the art, a LIDAR apparatus may emit light containing a frequency component that is swept through a predetermined range. That is, the frequency component varies in time according to a predetermined pattern, for example as set by the apparatus. In a swept frequency LIDAR apparatus, for example as described in the prior art, the distance to an object may be measured by detecting the frequency of light reflected by the object (comprising light emitted at an earlier time) and comparing this detected frequency with the frequency of the light being emitted at the time of detection. This frequency difference is then related to the return-path time of flight from the apparatus to the object and back, and the distance can then be determined based on time of flight.

Embodiments of the present disclosure may comprise a swept frequency LIDAR as described above, in which frequencies of both the first and second optical signals are varied over time while maintaining a frequency difference f$_t$ between the first and second optical signals that is constant in time, i.e. non-time-varying. Thus, such embodiments may determine the component of velocity of the object away from or toward the apparatus by the approach described above, while also determining the distance to the object by means of the swept frequency approach.

Alternatively, embodiments of the present disclosure may comprise a swept frequency LIDAR, in which one or both of the first and second optical signals are varied over time, and in which the frequency difference f$_t$ between the first and second optical signals is time-varying, for example according to a predetermined pattern or a pattern that can be determined by at least the LIDAR receiver. In such embodiments, the variation of f$_t$ with time can be recorded or calculated algorithmically by the LIDAR apparatus. The distance to the object, and hence the return-path time of flight, can be determined using the swept LIDAR distance determination approach described above. Using this information, the appropriate value of f$_t$ for use in the present disclosure can be determined. For example, for a signal received at a first time T$_R$ and a determined time of flight TOF, the appropriate value of f$_t$ may be set to the value off inherent in the emitted optical signals at time T$_R$–TOF, i.e. TOF seconds prior to T$_R$. The Doppler-based calculations as described above can then be performed using this value of f$_t$, corresponding to f$_t$ at the time when the received light was emitted. Thus, the method and apparatus of the present disclosure may determine the component of velocity of the object away from or toward the apparatus using the approach described above, while also determining the distance to the object using the swept frequency method.

Accordingly, in embodiments of the present disclosure, the emitter is configured to vary frequency of one or both of the first optical signal and the second optical signal over time. The apparatus is further configured to measure a distance to the object based on a comparison of frequency of one or both of the first received optical signal and the second received optical signal at time of detection with frequency of a respective one or both of the first optical signal and the second optical signal at time of emission.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A light detection and ranging (LIDAR) apparatus comprising:
    an emitter configured to emit a first optical signal and a second optical signal in a common direction for reflection by an object, wherein an optical frequency of the first optical signal differs from an optical frequency of the second optical signal by a first frequency difference; and
    a receiver configured to receive a first received optical signal due to reflection of the first optical signal by the object, receive a second received optical signal due to reflection of the second optical signal by the object, perform a first mixing operation using said first received optical signal and said second received optical signal to form an optical mixed signal having a component at a detection frequency, wherein said detection frequency is equal to a difference between a frequency of the first received optical signal and a frequency of the second received optical signal, and convert said optical mixed signal into an electronic signal using an optical detector;
    the apparatus further configured to
        extract the detection frequency using a first filter;
        perform a second mixing operation using the detection frequency and an indication of the first frequency difference to obtain a resultant signal;
        apply a second filter on said resultant signal to provide a filtered resultant signal;
        use a frequency detector to obtain a resultant frequency of the filtered resultant signal;
    and
        measure a component of velocity of the object toward or away from the apparatus based on the resultant frequency.

2. The apparatus of claim 1, wherein the optical detector receives the first received optical signal and the second received optical signal and forms the optical mixed signal, thereby performing the first mixing operation, and wherein the optical detector has a response bandwidth sufficient to output said detection frequency.

3. The apparatus of claim 1, wherein the indication of the first frequency difference is a reference signal having a major component at a reference frequency equal to the first frequency difference.

4. The apparatus of claim 3, wherein the emitter comprises one or more modulators configured to generate the first optical signal and the second optical signal by modulating input light using a modulation signal, and wherein the reference signal is obtained from, or is a portion of, the modulation signal.

5. The apparatus of claim 1, wherein the indication of the first frequency difference is a numerical indication of the first frequency difference, the apparatus further configured to:

measure the detection frequency by measuring a beat frequency present in the mixed signal;

numerically determine the resultant frequency equal to a difference between the measured detection frequency and the numerical indication of the first frequency difference; and compute the component of velocity based on the numerically determined resultant frequency.

6. The apparatus of claim 1, further comprising generating the indication of the first frequency difference using another optical detector configured to receive a portion of the first optical signal and a portion of the second optical signal prior to emission from the apparatus.

7. The apparatus of claim 1, wherein the receiver further comprises an amplifier, a filter, or both an amplifier and a filter, configured to receive and process the electronic mixed signal.

8. The apparatus of claim 1, wherein measuring the component of velocity comprises computing a difference between the first frequency difference and the detection frequency, and multiplying the computed difference by a scaling factor that is inversely proportional to the first frequency difference.

9. The apparatus of claim 1, wherein measuring the component of velocity of the object does not directly use a local copy or local portion of the first optical signal or the second optical signal, or a local copy or local portion of an optical signal used in generating the first optical signal or the second optical signal.

10. The apparatus of claim 1, wherein the emitter is further configured to emit the first optical signal as a pulsed signal having a first pulse edge emitted at a first time, and wherein the receiver is configured to detect a corresponding pulse edge in the first received optical signal and register a second time at which the corresponding pulse edge is detected, the apparatus further configured to measure a distance to the object based on a comparison of the first time and the second time.

11. The apparatus of claim 1, wherein the emitter is configured to vary frequency of one or both of the first optical signal and the second optical signal over time, and wherein the apparatus is further configured to measure a distance to the object based on a comparison of frequency of one or both of the first received optical signal and the second received optical signal at time of detection with frequency of a respective one or both of the first optical signal and the second optical signal at time of emission.

12. The apparatus of claim 1, further comprising adjusting the common direction over time to measure components of velocities of one or more further objects, or further portions of the same object, relative to the apparatus.

13. The apparatus of claim 1, wherein the emitter comprises an emitter beam scanner (EBS), and wherein the first optical signal and the second optical signal are emitted by the EBS as a combined beam directed in the common direction or as separate respective beams directed in the common direction.

14. The apparatus of claim 13, wherein the emitter further comprises a modulator configured to receive and modulate narrowband input light to generate a first pre-transmission signal having the optical frequency of the first optical signal and a second pre-transmission signal having the optical frequency of the second optical signal, the first optical signal based on the first pre-transmission signal and the second optical signal based on the second pre-transmission signal.

15. The apparatus of claim 14, wherein the modulator is a double sideband suppressed carrier (DSB-SC) modulator.

16. The apparatus of claim 1, wherein the emitter comprises:

a first emitter beam scanner (EBS) configured to emit the first optical signal according to a first radiation pattern having a first major lobe directed in the common direction; and a second emitter beam scanner (EBS) configured to concurrently emit the second optical signal according to a second radiation pattern having a second major lobe directed in the common direction.

17. The apparatus of claim 16, wherein the emitter further comprises:

an optical splitter configured to receive and split narrowband input light into a first input light and a second input light;

a first modulator configured to receive and modulate the first input light to generate a first pre-transmission signal having the optical frequency of the first optical signal, the first pre-transmission signal provided to the first EBS for use in generating the first optical signal; and a second modulator configured to receive and modulate the second input light to generate a second pre-transmission signal having the optical frequency of the second optical signal, the second pre-transmission signal provided to the second EBS for use in generating the second optical signal.

18. The apparatus of claim 1, wherein the receiver comprises an optical phased array (OPA), a grating coupler, or an edge coupler, the OPA, grating coupler or edge coupler operatively coupled to the optical detector.

19. The apparatus of claim 1, wherein the receiver comprises an avalanche photodiode (APD) or a silicon photomultiplier (SiPM) for detecting one or both of the first received signal and the second received signal.

20. The apparatus of claim 1, wherein the first optical signal and the second optical signal are at least partially co-polarized.

21. The apparatus of claim 1, further comprising a photodetector configured to perform said converting the optical mixed signal into the electronic signal, wherein the photodetector beats the first received optical signal with the second received optical signal.

22. A light detection and ranging (LIDAR) method for use by a device, said method comprising:

concurrently emitting a first optical signal and a second optical signal in a common direction for reflection by an object, wherein an optical frequency of the first optical signal differs from an optical frequency of the second optical signal by a first frequency difference; and receiving a first received optical signal due to reflection of the first optical signal by the object;

receiving a second received optical signal due to reflection of the second optical signal by the object;

processing the first received optical signal and the second received optical signal and measuring a component of velocity of the object toward or away from the device wherein said processing comprises performing a first mixing operation using said first received optical signal and said second received optical signal to form an optical mixed signal having a component at a detection frequency wherein said detection frequency is equal to a difference between a frequency of the first received optical signal and a frequency of the second received optical signal;

converting said optical mixed signal into an electronic signal using an optical detector;

extracting the detection frequency using a first filter;

performing a second mixing operation using the detection frequency and an indication of the first frequency difference to obtain a resultant signal;

applying a second filter on said resultant signal to provide a filtered resultant signal; and using a frequency detector to obtain a resultant frequency of the filtered resultant signal; and wherein measuring the component of velocity is based on the resultant frequency.

23. The method of claim 22, wherein the indication of the first frequency difference is a reference signal having a major component at a reference frequency equal to the first frequency difference.

24. The method of claim 23, wherein the reference signal is obtained from a modulation signal, and wherein one or more modulators are configured to generate the first optical signal and the second optical signal by modulating input light using the modulation signal.

25. The method of claim 22, wherein the indication of the first frequency difference is a numerical indication of the first frequency difference, the method further comprising:

measuring the detection frequency by measuring a beat frequency present in the mixed signal;

numerically determining the resultant frequency equal to a difference between the measured detection frequency and the numerical indication of the first frequency difference; and computing the component of velocity based on the numerically determined resultant frequency.

26. The method of claim 22, further comprising emitting the first optical signal as a pulsed signal having a first pulse edge emitted at a first time; detecting a corresponding pulse edge in the first received optical signal; registering a second time at which the corresponding pulse edge is detected; and measuring a distance to the object based on a comparison of the first time and the second time.

27. The method of claim 22, further comprising varying frequency of one or both of the first optical signal and the second optical signal over time, and measuring a distance to the object based on a comparison of frequency of one or both of the first received optical signal and the second received optical signal at time of detection with frequency of a respective one or both of the first optical signal and the second optical signal at time of emission.

28. The method of claim 22, wherein said converting the optical mixed signal into the electronic signal is performed using a photodetector and comprises, using the photodetector, beating the first received optical signal with the second received optical signal.

* * * * *